United States Patent
Tomlinson et al.

(10) Patent No.: US 8,958,553 B2
(45) Date of Patent: Feb. 17, 2015

(54) PUBLIC KEY CRYPTOSYSTEM BASED ON GOPPA CODES AND PUF BASED RANDOM GENERATION

(76) Inventors: Martin Tomlinson, Devon (GB); Cen Jung Tjhai, Devon (GB)

( * ) Notice: Subject to any disclaimer, the term of this patent is extended or adjusted under 35 U.S.C. 154(b) by 108 days.

(21) Appl. No.: 13/642,459

(22) PCT Filed: Apr. 21, 2011

(86) PCT No.: PCT/GB2011/000636
§ 371 (c)(1),
(2), (4) Date: Dec. 12, 2012

(87) PCT Pub. No.: WO2011/131950
PCT Pub. Date: Oct. 27, 2011

(65) Prior Publication Data
US 2013/0094649 A1    Apr. 18, 2013

(30) Foreign Application Priority Data
Apr. 22, 2010 (GB) .................................. 1006747.8

(51) Int. Cl.
*H04K 1/00* (2006.01)
*H04L 9/30* (2006.01)

(52) U.S. Cl.
CPC .............. *H04L 9/3026* (2013.01); *H04L 9/304* (2013.01); *H04L 2209/08* (2013.01); *H04L 2209/805* (2013.01)
USPC ............................................ 380/30; 715/746

(58) Field of Classification Search
None
See application file for complete search history.

(56) References Cited

U.S. PATENT DOCUMENTS

| | | | | |
|---|---|---|---|---|
| 5,054,066 A | * | 10/1991 | Riek et al. | 380/30 |
| 2005/0117745 A1 | * | 6/2005 | Lee et al. | 380/30 |
| 2009/0125780 A1 | | 5/2009 | Taylor et al. | |
| 2009/0254981 A1 | | 10/2009 | Devadas et al. | |
| 2009/0323928 A1 | | 12/2009 | Kerschbaum et al. | |

(Continued)

FOREIGN PATENT DOCUMENTS

| | | |
|---|---|---|
| FR | 2912019 A1 | 8/2008 |
| FR | 2912020 A1 | 8/2008 |

(Continued)

OTHER PUBLICATIONS

Grassi, M., and Th. Beth. "Codes for the Quantum Erasure Channel." Physical Review A 56.1 (1997): 33-38. Print.*

(Continued)

*Primary Examiner* — Saleh Najjar
*Assistant Examiner* — Jason Plotkin
(74) *Attorney, Agent, or Firm* — Procopio, Cory, Hargreaves & Savitch LLP

(57) ABSTRACT

This invention provides improved security of the McEliece Public Key encryption system adding features which make full use of random number generation for given message and cryptogram parameters, using this invention the encrypted message (i.e. the cryptogram) is a truly random function, not a pseudo random function of the message so that even with the same message and the same public key, a different, unpredictable cryptogram is produced each time. With the knowledge of the private key, the random function may be determined from the cryptogram and the message decrypted. Different embodiments of the invention are described which enable the level of security to be traded-off against cryptogram size and complexity. A number of different applications are given.

13 Claims, 10 Drawing Sheets

(56) References Cited

U.S. PATENT DOCUMENTS

2010/0086132 A1    4/2010  Tavernier et al.
2010/0088511 A1*   4/2010  Tavernier et al. ............. 713/162
2010/0279610 A1   11/2010  Bjhorn et al.
2011/0091033 A1*   4/2011  Michiels et al. ................ 380/28

FOREIGN PATENT DOCUMENTS

GB        2469393 B      2/2011
WO       01/50675 A2     7/2001
WO      2007/037869 A1   4/2007

OTHER PUBLICATIONS

The Combined Search and Examination Report from the UK Intellectual Property Office dated Nov. 24, 2010 for priority application GB1019346.4.

Biswas. "Hybrid McEliece." Code-Based Crypto, INRIA. Nov. 13, 2008. http://www-rocq.inria.fr/secret/CBCrypto/index.php?pg=hymes. Originally accessed Nov. 23, 2010 by the Examiner for priority application No. GB1019346.4.

The Notification of Grant from the UK Intellectual Property Office dated Jan. 18, 2011 for related application GB1006747.8 (GB2469393).

Cayrel et al. "McEliece/Niederreiter PKC: Sensitivity to Fault Injection." 5th International Conference on Future Information Technology. May 21-23, 2010 pp. 1-6. INSPEC Accession No. 11365495.

Patterson. "The Algebraic Decoding of Goppa Codes." IEEE Transactions on Information Theory. 21(2):203-207 (Mar. 1975).

Retter. "Decoding Goppa Codes with a BCH Decoder." IEEE Transactions on Information Theory. IT-21:112, Jan. 1975.

Sugiyama et al. "An Erasures-and-Errors Decoding Algorithm for Goppa Codes." IEEE Transactions on Information Theory. IT-22:238-241, Mar. 1976.

Li et al. "On the Equivalence of McEliece's and Niederreiter's Public-Key Cryptosystems." IEEE Transactions on Information Theory. 40(1):271-273 (Jan. 1994).

Lin et al. "Information Rate of McEliece's Public-Key Encryption." Electronic Letters. 26(1): 16-18 (Jan. 4, 1990).

Park. "Improving Code Rate of McEliece's Public-Key Cryptosystem." Electronics Letters. 25(21):1466-1467 (Oct. 12, 1989).

Jordan. "A Variant of a Public Key Cryptosystem Based on Goppa Codes." ACM SigAct News 15(1):25-30 (1983).

Berger et al. "Reducing Key Length of the McEliece Cryptosystem." Proceedings of the 2nd International Conference on Cryptography in Africa: Progress in Cryptology. pp. 77-97, 2009. http://www.unilim.fr/pages_perso/philippe.gaborit/reducing.pdf.

McEliece. "A Public-Key Cryptosystem Based on Algebraic Coding Theory." DSN Progress Report 42-44. pp. 114-116 (Jan. and Feb. 1978).

Grahame et al. "A Method for Obtaining Digital Signatures and Public-Key Cryptosystems." Communications of the ACM 21(2):120-126 (1978).

Daemen et al. "The Design of Rijndael: AES—The Advanced Encryption Standard." Springer, 2002 (pp. 1-51).

The Response Made to Report under Section 18(3) from the UK Intellectual Property Office dated Jan. 21, 2011 for priority application GB 1019346.4.

Menezes et al. "McEliece Public Key Encryption." CRC Press, Chapter 8, Section 8.5, pp. 298-299. Oct. 1996. Retrieved from http://www.cacr.math.uwaterloo.ca/hac/about/chap8.pdf.

The Search Report under Section 17 from UK Intellectual Property Office dated Aug. 23, 2010 for related application GB1006747.8.

The International Search Report and Written Opinion for PCT/GB2011/000636, mailed Oct. 6, 2011, in 16 pages.

The Search Report for GB 1006747.8, dated Aug. 20, 2010, in 1 page.

Menezes et al. "Handbook of Applied Cryptography." Chapter 8, "McEliece public key encryption," pp. 283-319. CRC Press, Oct. 1996. Retrieved from http://www.cacr.math.uwaterloo.ca/hac/about/chap8.pdf.

* cited by examiner

PUBLIC KEY CRYPTOSYSTEM BASED ON GOPPA CODES AND PUF BASED RANDOM GENERATION

FIELD OF THE INVENTION

This invention relates to computerised methods and apparatus for encrypting and decrypting data using public key encryption techniques, and to computerised methods and apparatus for communications using such techniques, as well as other applications thereof.

DESCRIPTION OF THE BACKGROUND ART

In 1978 the distinguished mathematician Robert McEliece invented a Public Key Encryption system [1] based upon encoding information as codewords using an error correcting code from the family of Goppa [2] codes. A randomly chosen error pattern containing up to t bits is added to each codeword and several such constructed codewords make up the cryptogram. On reception the associated private key is used to invoke an error correcting decoder based upon the underlying Goppa code to correct the errored bits in each codeword, prior to retrieval of all of the message bits.

In U.S. Pat. No. 5,054,066, Riek and McFarland improved the security of the system by complementing the error patterns so as to increase the number of errors contained in the cryptogram [3] and cited other variations of the original system.

In the originally proposed Public Key encryption system [1] a codeword is generated from message bits by using a permuted, scrambled generator matrix of a Goppa code [2] of length n symbols, capable of correcting t errors. This matrix is the public key. The digital cryptogram is formed from codewords corrupted by exactly t randomly, or t pseudo-randomly, chosen bit errors. The security strength of the McEliece Public Key encryption system stems from the fact that a truly random binary error pattern is added to the encoded message as part of the digital cryptogram. The security is provided by the fact that it is impossible to remove the unknown bit errors unless the original unpermuted Goppa code, the private key, is known in which case the errors can be removed by correcting them and then descrambling the information bits in the codeword to recover the original message. Even with the same message and the same public key a different digital cryptogram is produced each time. The messages are encoded with a scrambled, binary mapped, permuted, version of a $GF(2^m)$ Goppa code. Without the knowledge of the particular Goppa code that is used, the error patterns cannot be corrected and the messages cannot be recovered. It is not possible to deduce which particular Goppa code is being used from the public key, which is the matrix used for encoding, because this matrix is a scrambled, permuted version of the original encoding matrix of the Goppa code, plus the fact that for a given in there are an extremely large number of Goppa codes [1]. In the original example given in [1], the codeword length n is 1024 and t is 50. The number of possible error combinations is $3.19 \times 10^{85}$ equivalent to a secret key of length 284 bits.

SUMMARY OF THE INVENTION

This invention is concerned with providing additional features to the original McEliece system which enhance the bandwidth efficiency and security of the Public Key Encryption arrangement, and to applications thereof. The invention is defined by the independent claims herewith. The following non-limiting summary is for technical information purposes only.

In the invention, a message is encrypted by first partitioning the message into message vectors of length k bits each and encoding these message vectors into codewords which are corrupted by a combination of bit errors and bit deletions to form the cryptogram.

It is a feature of the invention that the number of bit errors in each corrupted codeword is not fixed, but is an integer s, which is randomly chosen, with the constraint that, s<t. This increases the number of possible error combinations, thereby increasing the security of the system. Furthermore it is shown that as a consequence 2(t−s) bits may be deleted from the codeword in random positions adding to the security of the digital cryptogram as well as reducing the size of the digital cryptogram, without shortening the message.

In the case of the original example, above, with t/2<s<t, the number of possible error combinations is increased to $3.36 \times 10^{85}$ and the average codeword in the cryptogram is reduced to 999 bits from 1024 bits.

Unlike most encryption systems, a characteristic of the encryption arrangement of an embodiment of the invention is the use of a truly random integer generator, not a pseudo random generator to form the cryptogram. Consequently the cryptogram is not predictable or deterministic. Even with the same message and public key the cryptogram produced will be different each time and without knowledge of the random errors and bit deletions, which may be determined only by using the structure of the Goppa code, recovery of the original message is impossible.

In a further embodiment of the invention, to reduce the size of the cryptogram, only the first Goppa codeword is corrupted with a random error vector. The following codewords contained in the cryptogram are corrupted by deleting bits in 2t random bit positions, defined by a position vector, known to the recipient of the cryptogram. With the Goppa code codewords of length n bits with k information bits correcting t errors, the shortened codewords have length n−2t and still contain k information bits, improving the bandwidth efficiency of the system. The recipient of the cryptogram, knowing the positions of the 2t deleted bits in each codeword, marks these bit positions as erasures.

The Goppa code is capable of correcting 2t erasures in each codeword and in this way the original message is retrieved.

In another embodiment of the invention, to reduce further the size of the cryptogram, only the first Goppa codeword is corrupted with a random error vector, and this vector is used to provide the initial state of a scrambler which is used to scramble all of the following message bits which are sent uncoded. In this embodiment of the invention, the cryptogram contains only one Goppa codeword. In a further embodiment of the invention, to enhance the security of the system, in addition to scrambling using the fixed non-singular matrix contained in the Public Key, a different scrambler for 0 each message vector is used. This scrambler is derived front the random error vector which is added to the codeword to produce the corrupted codeword after encoding using the permuted, scrambled generator matrix of a Goppa code. As the constructed digital cryptogram is a function of truly randomly chosen vectors, not pseudo randomly chosen vectors, or a fixed vector, the security of the Public Key encryption system is enhanced compared to the standard McEliece Public Key system. Even with an identical message and using the same public key, the resulting cryptograms will have no similarity at all. This is not true for the standard McEliece Public Key system as each codeword will only differ in a maximum of 2t bit positions.

In another embodiment of the invention, to enhance the security of the system and to make broadcasting of digital cryptograms easier, additional errors may be inserted into the digital cryptogram so that each corrupted codeword contains more than t errors. A sophisticated method of introducing the additional errors is not necessary since provided there are sufficient additional errors to defeat decryption based on guessing the positions of the additional errors the message is theoretically unrecoverable front the corrupted digital cryptogram even with knowledge of the private key This feature may find applications where a message needs to be distributed to several recipients using the same or different Public/Private Keys at the same time, possibly in a commercial, competitive environment. The corrupted digital cryptograms may be sent to each recipient arriving asynchronously, due to variable network delays and only the relatively short key containing information of the additional error positions needs to be sent at the same time to all recipients.

In a further embodiment of the invention, to enhance the security of the system, additional errors are inserted into each codeword in positions defined by a position vector, which is derived front a cryptographic hash of the previous message vector. Standard hash function may be used and an example is given using SHA-256 [9]. The first message vector uses a position vector derived from a hash or message already known by the recipient of the cryptogram.

The invention may be used in a wide number of different applications such as active and passive RFID secure barcodes, secure ticketing, magnetic cards, message services, e-mail applications, digital broadcasting, digital communications, video communications and digital storage. Encryption and decryption is amenable to high speed implementation operating at speeds beyond 1 Gbit/sec.

BRIEF DESCRIPTION OF THE DRAWINGS

Embodiments of the invention will now be illustrated, by way of example only, with reference to the accompanying drawings in which.

DETAILED DESCRIPTION OF THE PREFERRED EMBODIMENTS

Figure 1:
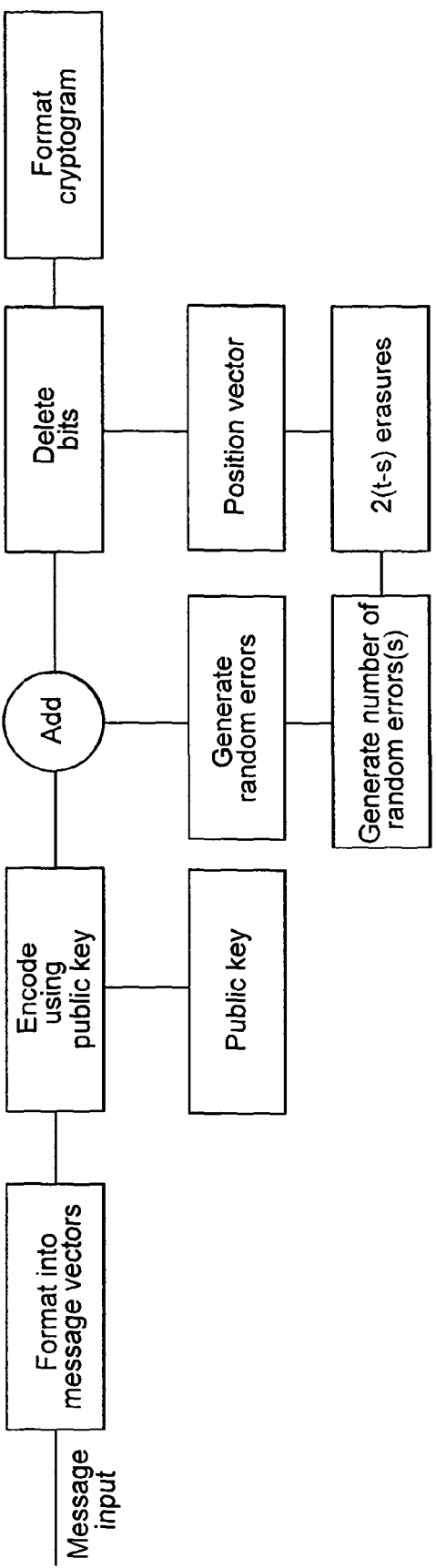
FIG. 1 is a block diagram which shows the structure of a Public Key encryption system with s random bit errors and 2(t−s) bit deletions according to an embodiment of the invention.

The message information to be sent, if not in digital form, is digitally encoded into binary form comprising a sequence of information bits. The method of encryption is shown in FIG. 1. The message comprising a sequence of information bits is formatted by appending dummy bits as necessary into an integral number m of binary message vectors of length k bits each. This is carried out by format into message vectors shown in FIG. 1. Each message vector is scrambled and encoded into a codeword, n bits long, defined by an error correcting code which is derived from a binary Goppa code and a scrambling matrix. The binary Goppa code is derived itself from a non-binary Goppa code and the procedure is described below for a specific example.

The encode using public key shown in FIG. 1 carries out the scrambling and codeword encoding for each message vector by selecting rows of the codeword generator matrix according to the message bits contained in the message vector. This operation is described in more detail below for a specific example. The codeword generator matrix to be used for encoding is defined by the public key which is stored in a buffer memory, public key shown in FIG. 1. As shown in FIG. 1 a random number generator generates a number s internally constrained to be less than or equal to t and this is carried out by generate number of random errors (s). The parameter t is the number of bit errors that the Goppa code can correct.

The number of random errors s is input to generate random errors which for each codeword, initialises an n bit buffer memory with zeros, and uses a random number generator to generate s 1's in s random positions of the buffer memory. The contents of the n bit buffer are added to the codeword of n bits by add shown in FIG. 1. The 1's are added modulo 2 which inverts the codeword bits in these positions so that these bits are in error. In FIG. 1 t−s erasures takes the input s, calculates 2(t−s) and outputs this value to position vector which comprises a buffer memory of n bits containing a sequence of integers corresponding to a position vector described below. The first 2(t−s) integers are input to delete bits which deletes the bits in the corresponding positions of the codeword so that 2(t−s) bits of the codeword are deleted. The procedure is carried out for each codeword so that each codeword is randomly shortened due to deleted bits and corrupted with a random number of bit errors in random positions. In FIG. 1 format cryptogram has the sequence of shortened corrupted codewords as input and appends these together, together with formatting information to produce the cryptogram.

Figure 2:
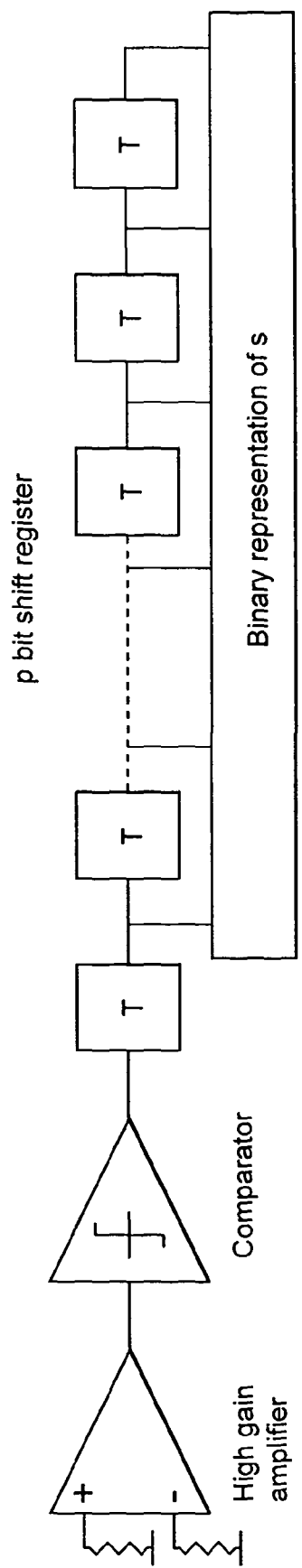
FIG. 2 is a block diagram which shows the structure of a random integer generator of the number of added random bit errors, s, which is preferably used with the embodiment of FIG. 1.

The highest level of security is provided by generate number of random errors (s) of FIG. 1 being a truly random number generator and not a pseudo random generator. An example of a random number generator is shown in FIG. 2. The differential amplifier, with high gain amplifies the thermal noise generated by the resistor terminated inputs. The output of the amplifier is the amplified random noise which is input to a comparator which carries out binary quantisation. The comparator output is a 1 if the amplifier output is a positive voltage and a 0 otherwise. This produces 1's and 0's with equal probability at the output of the comparator. The output of the comparator is clocked into a shift register having p shift register stages, each of delay T. The clock rate is 1/T. After p clock cycles the contents of the shift register represents a number in binary which is the random number s having a uniform probability distribution between 0 and $2^p-1$.

One or more of the bits output from the shift register may be permanently set to a 1 to provide a lower limit to the random number of errors s. As an example if the $4^{th}$ bit (counting from 0) is permanently set to 1 then s has a uniform probability distribution between $2^3=8$ and $2^p-1$.

Similarly the highest level of security is provided if the positions of the errors generated by generate random errors of FIG. 1 is a truly random number generator and not a pseudo random generator. An example of an arrangement which generates truly random positions in the range of 0 to $2^m-1$ corresponding to the codeword length is shown in FIG. 3.

Figure 3:
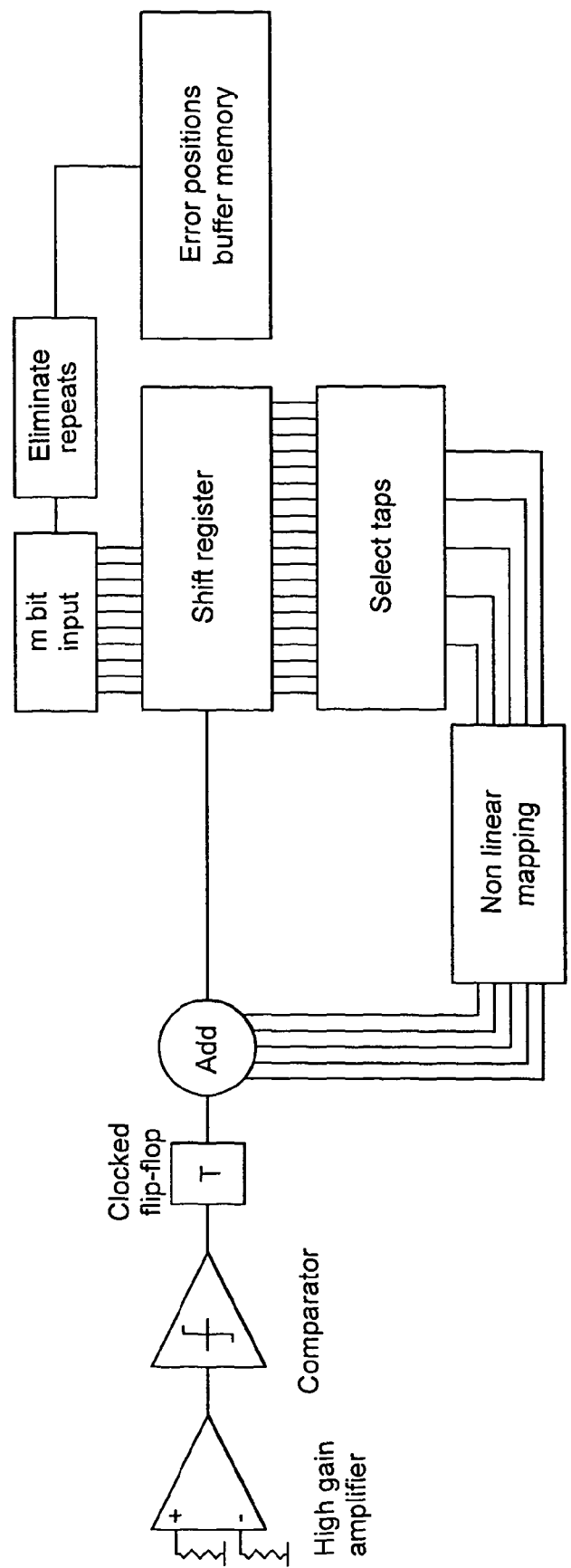
FIG. 3 is a block diagram which shows the structure of a random integer generator for generating error positions randomly, which is preferably used with the embodiment of FIG. 1.

As shown in FIG. 3, the differential amplifier, with high gain amplifies the thermal noise generated by the resistor terminated inputs. The output of the amplifier is the amplified random noise which is input to a comparator which outputs a 1 if the amplifier output is a positive voltage and a 0 otherwise. This produces 1's and 0's with equal probability at the output of the comparator. The output of the comparator is clocked into a flip-flop clocked at 1/T, with the same clock source as the shift register shown in FIG. 3, shift register. The output of the flip-flop is a clocked output of truly random 1's and 0's which is input to a non-linear feedback

TABLE 1

Example of non-linear mapping for u = 4

0000 → 0011
0001 → 1011
0010 → 0111
0011 → 0110
0100 → 1111
0101 → 0001
0110 → 1001
0111 → 1100
1000 → 1010
1001 → 0000
1010 → 1000
1011 → 0010
1100 → 0101
1101 → 1110
1110 → 0100
1111 → 1101 shift register arrangement.

The output of the flip-flop is input to a modulo 2, adder add which is added to the outputs of a non-linear mapping of u selected outputs of the shift register. Which outputs are selected corresponds to the key which is being used. The parameter u is a design parameter typically equal to 8.

The non-linear mapping non linear mapping shown in FIG. 3 has a pseudorandom one to one correspondence between each of the $2^u$ input states to each of the $2^u$ output states. An example of such a one to one correspondence, for u=4 is given in Table 1. For example, the first entry, 0000, value 0 is mapped to 0011, value 3.

The shift register typically has a relatively large number of stages, 64 is a typical number of stages and a number of tapped outputs, typically 8. The relationship between the input of the shift register $a_{in}$ and the tapped outputs is usually represented by the delay operator D. Defining the tap positions as $w_i$ for i=0 to $i_{max}$, the input to the non-linear mapping non linear mapping shown in FIG. 3, defined as $x_i$ for i=0 to $i_{max}$, is //

$$x_i = a_{in} D^{w_i} \tag{1}$$

and the output $y_j$ after the mapping function, depicted as M is //

$$y_j = M[x_i] = M[a_{in} D^{w_i}] \tag{2}$$

The input to the shift register is the output of the adder given by the sum of the random input $R_{nd}$ and the summed output of the mapped outputs. Accordingly $$a_{in} = R_{nd} + \sum_{j=o}^{i_{max}} y_j = R_{nd} + \sum_{j=o}^{i_{max}} M[x_i] = R_{nd} + \sum_{j=o}^{i_{max}} M[a_{in} D^{w_i}] \tag{3}$$

It can be seen that the shift register input $a_{in}$ is a non-linear function of delayed outputs of itself added to the random input $R_{nd}$ and so will be a random binary function.

The positions of the errors is given by the output of m bit input shown in FIG. 3, an m bit memory register and defined as $e_{pos}$. Without loss of generality consider that the first m outputs of the shift register are used as the input to m bit input. The output of m bit input is a binary representation of a number given by $$e_{pos} = \sum_{j=o}^{m-1} 2^j \times a_{in} D^j \tag{4}$$

Since $a_{in}$ is a random binary function $e_{pos}$ will be an integer between 0 and $2^m-1$ randomly distributed with a uniform distribution. As shown in FIG. 3 these randomly generated integers are stored in memory in error positions buffer memory after eliminate repeats has eliminated any repeated numbers, since repeated integers will occur from time to time in any independently distributed random integer generator.

The random bit errors and bit deletions can only be corrected with the knowledge of the particular non-binary Goppa code, the private key, which is used in deriving the codeword generator matrix. In describing additional details of the invention, some background on Goppa codes is necessary: Goppa defined a family of codes [2] where the coordinates of each codeword $\{c_0, c_1, c_2, \ldots c_{2^m-1}\}$ with $\{c_0=x_0, c_1=x_1, c_2=x_2, \ldots c_{2^m-1}=x_{2^m-1}\}$ satisfy the congruence p(z) modulo g(z)=0 where g(z) is now known as the Goppa polynomial and p(z) is the Lagrange interpolation polynomial.

Goppa codes have coefficients from $GF(2^m)$ and provided g(z) has no roots which are elements of $GF(2^m)$ (which is straightforward to achieve) the Goppa codes have parameters $(2^m, k, 2^m-k+1)$. Goppa codes can be converted into binary codes, provided that g(z) has no roots which are elements of $GF(2^m)$ and has no repeated roots, have parameters $(2^m, 2^m-mt, d_{min})$ where $d_{min} \geq 2t+1$, the Goppa code bound on mimimum Hamming distance. Most binary Goppa codes have equality for the bound and t is the number of correctible errors.

For a Goppa polynomial of degree r there are r parity check equations defined from the congruence. Denoting g(z) by $$g(z) = g_r z^r + g_{r-1} z^{r-1} + g_{r-2} z^{r-2} + \ldots + g_1 z + g_0 \tag{5}$$

$$\sum_{i=0}^{2^m-1} \frac{c_i}{z - \alpha_i} = 0 \text{ modulo } g(z) \tag{6}$$

Since equation (6) is modulo g(z) then g(z) is equivalent to 0, and we can add g(z) to the numerator. Dividing each term $z-\alpha_i$ into $1+g(z)$ produces the following $$\frac{g(z) + 1}{z - \alpha_i} = q_i(z) + \frac{r_m + 1}{z - \alpha_i} \tag{7}$$

Where $r_m$ is the remainder, an element of $GF(2^m)$ after dividing g(z) by $z-\alpha_i$. As $r_m$ is a scalar, g(z) may simply be pre-multiplied by $1/r_m$ so that the remainder cancels with the other numerator term which is 1.

$$\frac{\frac{g(z)}{r_m} + 1}{z - \alpha_i} = \frac{q_i(z)}{r_m} + \frac{\frac{r_m + 1}{r_m}}{z - \alpha_i} = \frac{q(z)}{r_m} \tag{8}$$

As $$g(z) = (z - \alpha_i) q_i(z) + r_m \tag{9}$$

When $z = \alpha_i$, $r_m = g(\alpha_i)$

Substituting for $r_m$ in equation(8) produces $$\frac{\frac{g(z)}{g(\alpha_i)}+1}{z-\alpha_i}=\frac{q_i(z)}{g(\alpha_i)} \quad (10)$$

Since $$\frac{g(z)}{g(\alpha_i)}$$

modulo $g(z)=0$ $$\frac{1}{z-\alpha_i}=\frac{q_i(z)}{g(\alpha_i)} \quad (11)$$

The quotient polynomial $q_i(z)$ is a polynomial of degree $r-1$ with coefficients which are a function of $\alpha_i$ and the Goppa polynomial coefficients. Denoting $q_i(z)$ as $$q_i(z)=q_{i,0}+q_{i,1}z+q_{i,2}z^2+q_{i,3}z^3+\ldots+q_{i,(r-1)}z^{r-1} \quad (12)$$

Since the coefficients of each power of z sum to zero the r parity check equations are given by $$\sum_{i=0}^{2^m-1}\frac{c_i q_{i,j}}{g(\alpha_i)}=0 \text{ for } j=0 \text{ to } r-1 \quad (13)$$

If the Goppa polynomial has any roots which are elements of $GF(2^m)$, say $\alpha_j$, then the codeword coordinate $c_j$ has to be permanently set to zero in order to satisfy the parity check equations. Effectively the codelength is shortened by the number of roots of $g(z)$ which are elements of $GF(2^m)$. Usually the Goppa polynomial is chosen to have distinct roots which are not in $GF(2^m)$.

The security depends upon the number of bit errors added and in practical examples of the invention it is necessary to use long Goppa codes of length 1024 bits, 2048 bits or longer. For clarity, the invention will be described by way of example for a binary Goppa code of length 32 bits capable of correcting 4 bit errors. It is important to note that all binary Goppa codes are derived from non-binary Goppa codes which are designed first.

In this example the non-binary Goppa code consists of 32 symbols from the Galois field $GF(2^5)$ and each symbol takes on 32 possible values with the code capable of correcting 2 errors. There are 28 information symbols and 4 parity check symbols. (It should be noted that when the Goppa code is used with information symbols restricted to 2 values as a binary Goppa code, twice as many errors can be corrected). The non-binary Goppa code has parameters of a (32,28,5) code. There are 4 parity check symbols defined by the 4 parity check equations and the Goppa polynomial has degree 4. Choosing arbitrarily as the Goppa polynomial, the polynomial $1+z+z^4$ which has roots only in $GF(16)$ and none in $GF(32)$, we determine $q_i(z)$ by dividing by $z-\alpha_i$.

$$q_i(z)=z^3+\alpha_i z^2+\alpha_i^2 z+(1+\alpha_i^3) \quad (14)$$

The 4 parity check equations are $$\sum_{i=0}^{31}\frac{c_i}{g(\alpha_i)}=0 \quad (15)$$

$$\sum_{i=0}^{31}\frac{c_i \alpha_i}{g(\alpha_i)}=0 \quad (16)$$

$$\sum_{i=0}^{31}\frac{c_i \alpha_i^2}{g(\alpha_i)}=0 \quad (17)$$

$$\sum_{i=0}^{31}\frac{c_i(1+\alpha_i^3)}{g(\alpha_i)}=0 \quad (18)$$

Using $GF(2^5)$ Table 2 to evaluate the different terms for $GF(2^5)$, the parity check matrix is $$H_{(32,28,5)}=\begin{bmatrix} 1 & 1 & \alpha^{14} & \alpha^{28} & \alpha^{20} & \alpha^{25} & \ldots & \alpha^{10} \\ 0 & 1 & \alpha^{15} & \alpha^{30} & \alpha^{23} & \alpha^{29} & \ldots & \alpha^{9} \\ 0 & 1 & \alpha^{16} & \alpha^{1} & \alpha^{26} & \alpha^{2} & \ldots & \alpha^{8} \\ 1 & 0 & \alpha^{12} & \alpha^{24} & \alpha^{5} & \alpha^{17} & \ldots & \alpha^{5} \end{bmatrix} \quad (19)$$

To implement the Goppa code as a binary code, the symbols in the parity check matrix are replaced with their m-bit binary column representations of each respective $GF(2^m)$ symbol. For the (32,28,5) Goppa code above, each of the 4 parity symbols will be represented as a 5 bit symbol from Table 2. The parity check matrix will now have 20 rows for the binary code. The minimum Hamming distance of the binary Goppa code is improved from $r+1$ to $2r+1$. Correspondingly the binary Goppa code becomes a (32,12,9) code with parity check matrix

TABLE 2

GF(32) non-zero extension field elements defined by $1+\alpha^2+\alpha^5=0$ $\alpha^0 = 1$
$\alpha^1 = \alpha$
$\alpha^2 = \alpha^2$
$\alpha^3 = \alpha^3$
$\alpha^4 = \alpha^4$
$\alpha^5 = 1+\alpha^2$
$\alpha^6 = \alpha+\alpha^3$
$\alpha^7 = \alpha^2+\alpha^4$
$\alpha^8 = 1+\alpha^2+\alpha^3$
$\alpha^9 = \alpha+\alpha^3+\alpha^4$
$\alpha^{10} = 1+\alpha^4$
$\alpha^{11} = 1+\alpha+\alpha^2$
$\alpha^{12} = \alpha+\alpha^2+\alpha^3$
$\alpha^{13} = \alpha^2+\alpha^3+\alpha^4$
$\alpha^{14} = 1+\alpha^2+\alpha^3+\alpha^4$
$\alpha^{15} = 1+\alpha+\alpha^2+\alpha^3+\alpha^4$
$\alpha^{16} = 1+\alpha+\alpha^3+\alpha^4$
$\alpha^{17} = 1+\alpha+\alpha^4$
$\alpha^{18} = 1+\alpha$
$\alpha^{19} = \alpha+\alpha^2$
$\alpha^{20} = \alpha^2+\alpha^3$
$\alpha^{21} = \alpha^3+\alpha^4$
$\alpha^{22} = 1+\alpha^2+\alpha^4$
$\alpha^{23} = 1+\alpha+\alpha^2+\alpha^3$
$\alpha^{24} = \alpha+\alpha^2+\alpha^3+\alpha^4$
$\alpha^{25} = 1+\alpha^3+\alpha^4$ TABLE 2-continued GF(32) non-zero extension field elements defined by $1 + \alpha^2 + \alpha^5 = 0$ $\alpha^{26} = 1 + \alpha + \alpha^2 + \alpha^4$
$\alpha^{27} = 1 + \alpha + \alpha^3$
$\alpha^{28} = \alpha + \alpha^2 + \alpha^4$
$\alpha^{29} = 1 + \alpha^3$
$\alpha^{30} = \alpha + \alpha^4$ $$H_{(32,12,9)} = \begin{bmatrix} 1 & 1 & 1 & 0 & 0 & 1 & \dots & 1 \\ 0 & 0 & 0 & 1 & 0 & 0 & \dots & 0 \\ 0 & 0 & 1 & 1 & 1 & 0 & \dots & 0 \\ 0 & 0 & 1 & 0 & 1 & 1 & \dots & 0 \\ 0 & 0 & 1 & 1 & 0 & 1 & \dots & 1 \\ 0 & 1 & 1 & 0 & 1 & 1 & \dots & 0 \\ 0 & 0 & 1 & 1 & 1 & 0 & \dots & 1 \\ 0 & 0 & 1 & 0 & 1 & 0 & \dots & 0 \\ 0 & 0 & 1 & 0 & 1 & 1 & \dots & 1 \\ 0 & 0 & 1 & 1 & 0 & 0 & \dots & 1 \\ 0 & 1 & 1 & 1 & 1 & 0 & \dots & 1 \\ 0 & 0 & 1 & 0 & 1 & 0 & \dots & 0 \\ 0 & 0 & 0 & 0 & 1 & 1 & \dots & 1 \\ 0 & 0 & 1 & 0 & 0 & 0 & \dots & 1 \\ 0 & 0 & 1 & 0 & 1 & 0 & \dots & 0 \\ 1 & 0 & 0 & 0 & 1 & 1 & \dots & 1 \\ 0 & 0 & 1 & 1 & 0 & 1 & \dots & 0 \\ 0 & 0 & 1 & 1 & 1 & 0 & \dots & 1 \\ 0 & 0 & 1 & 1 & 0 & 0 & \dots & 0 \\ 0 & 0 & 0 & 1 & 0 & 1 & \dots & 0 \end{bmatrix} \quad (20)$$

The next step is to turn the parity check matrix into reduced echelon form by using elementary matrix row and column operations so that there are 20 rows representing 20 independent parity check equations for each parity bit as described in standard text-books on error correcting codes [4, 5]. From the reduced echelon parity check matrix the generator matrix can be obtained straightforwardly as it is the transpose of the reduced echelon parity check matrix. The resulting generator matrix is It will be noticed that the generator matrix is in reduced echelon form and has 12 rows, one row for each information bit. Each row is the codeword resulting from that information bit equal to a 1, all other information bits equal to 0. The next step is to scramble the information bits by multiplying by a k×k non-singular matrix, that is one that is invertible. As a simple example the following 12×12 matrix is invertible.

$$NS_{12 \times 12} = \begin{bmatrix} 0 & 1 & 1 & 1 & 0 & 1 & 0 & 0 & 1 & 1 & 1 & 0 \\ 0 & 0 & 1 & 1 & 1 & 0 & 1 & 0 & 0 & 1 & 1 & 1 \\ 1 & 0 & 0 & 1 & 1 & 1 & 0 & 1 & 0 & 0 & 1 & 1 \\ 1 & 1 & 0 & 0 & 1 & 1 & 1 & 0 & 1 & 0 & 0 & 1 \\ 1 & 1 & 1 & 0 & 0 & 1 & 1 & 1 & 0 & 1 & 0 & 0 \\ 0 & 1 & 1 & 1 & 0 & 0 & 1 & 1 & 1 & 0 & 1 & 0 \\ 0 & 0 & 1 & 1 & 1 & 0 & 0 & 1 & 1 & 1 & 0 & 1 \\ 1 & 0 & 0 & 1 & 1 & 1 & 0 & 0 & 1 & 1 & 1 & 0 \\ 0 & 1 & 0 & 0 & 1 & 1 & 1 & 0 & 0 & 1 & 1 & 1 \\ 1 & 0 & 1 & 0 & 0 & 1 & 1 & 1 & 0 & 0 & 1 & 1 \\ 1 & 1 & 0 & 1 & 0 & 0 & 1 & 1 & 1 & 0 & 0 & 1 \\ 1 & 1 & 1 & 0 & 1 & 0 & 0 & 1 & 1 & 1 & 0 & 0 \end{bmatrix} \quad (22)$$

It is invertible using this matrix $$NS_{12 \times 12}^{-1} = \begin{bmatrix} 1 & 1 & 0 & 1 & 0 & 0 & 0 & 0 & 0 & 0 & 0 & 0 \\ 0 & 1 & 1 & 0 & 1 & 0 & 0 & 0 & 0 & 0 & 0 & 0 \\ 0 & 0 & 1 & 1 & 0 & 1 & 0 & 0 & 0 & 0 & 0 & 0 \\ 0 & 0 & 0 & 1 & 1 & 0 & 1 & 0 & 0 & 0 & 0 & 0 \\ 0 & 0 & 0 & 0 & 1 & 1 & 0 & 1 & 0 & 0 & 0 & 0 \\ 0 & 0 & 0 & 0 & 0 & 1 & 1 & 0 & 1 & 0 & 0 & 0 \\ 0 & 0 & 0 & 0 & 0 & 0 & 1 & 1 & 0 & 1 & 0 & 0 \\ 0 & 0 & 0 & 0 & 0 & 0 & 0 & 1 & 1 & 0 & 1 & 0 \\ 0 & 0 & 0 & 0 & 0 & 0 & 0 & 0 & 1 & 1 & 0 & 1 \\ 1 & 0 & 0 & 0 & 0 & 0 & 0 & 0 & 0 & 1 & 1 & 0 \\ 0 & 1 & 0 & 0 & 0 & 0 & 0 & 0 & 0 & 0 & 1 & 1 \\ 1 & 0 & 1 & 0 & 0 & 0 & 0 & 0 & 0 & 0 & 0 & 1 \end{bmatrix} \quad (23)$$

The next step is to scramble the generator matrix with the non-singular matrix to produce the scrambled generator matrix given below. The code produced with this generator matrix has the same codewords as the generator matrix given by matrix (21) and can correct the same number of errors but there is a different mapping to codewords from a given information bit pattern.

$$G_{(32,12,9)} = \begin{bmatrix} 1 & 0 & 0 & 0 & 0 & 0 & 0 & 0 & 0 & 0 & 0 & 0 & 1 & 1 & 0 & 0 & 0 & 1 & 1 & 1 & 1 & 0 & 1 & 0 & 0 & 1 & 1 & 1 & 0 & 1 & 1 & 0 \\ 0 & 1 & 0 & 0 & 0 & 0 & 0 & 0 & 0 & 0 & 0 & 0 & 1 & 1 & 0 & 1 & 0 & 1 & 1 & 0 & 0 & 0 & 0 & 1 & 1 & 0 & 1 & 0 & 1 & 1 & 0 & 0 \\ 0 & 0 & 1 & 0 & 0 & 0 & 0 & 0 & 0 & 0 & 0 & 0 & 0 & 1 & 1 & 0 & 0 & 1 & 1 & 0 & 0 & 0 & 0 & 1 & 1 & 0 & 1 & 0 & 0 & 1 & 0 \\ 0 & 0 & 0 & 1 & 0 & 0 & 0 & 0 & 0 & 0 & 0 & 0 & 0 & 1 & 1 & 1 & 1 & 1 & 0 & 1 & 0 & 1 & 0 & 1 & 1 & 0 & 0 & 0 & 1 & 0 & 1 & 0 \\ 0 & 0 & 0 & 0 & 1 & 0 & 0 & 0 & 0 & 0 & 0 & 0 & 1 & 1 & 0 & 0 & 0 & 0 & 1 & 1 & 0 & 1 & 0 & 0 & 1 & 1 & 1 & 0 & 0 & 0 & 0 & 1 \\ 0 & 0 & 0 & 0 & 0 & 1 & 0 & 0 & 0 & 0 & 0 & 0 & 1 & 1 & 1 & 1 & 1 & 0 & 0 & 1 & 1 & 0 & 0 & 0 & 1 & 0 & 1 & 0 & 1 & 0 & 0 & 1 \\ 0 & 0 & 0 & 0 & 0 & 0 & 1 & 0 & 0 & 0 & 0 & 0 & 0 & 0 & 0 & 1 & 0 & 1 & 1 & 1 & 1 & 1 & 1 & 0 & 0 & 0 & 1 & 1 & 1 & 0 & 0 \\ 0 & 0 & 0 & 0 & 0 & 0 & 0 & 1 & 0 & 0 & 0 & 0 & 0 & 0 & 0 & 1 & 1 & 1 & 0 & 0 & 1 & 1 & 0 & 0 & 1 & 1 & 1 & 0 & 0 & 0 & 1 & 0 & 0 \\ 0 & 0 & 0 & 0 & 0 & 0 & 0 & 0 & 1 & 0 & 0 & 0 & 0 & 1 & 1 & 1 & 0 & 1 & 1 & 1 & 1 & 1 & 1 & 0 & 1 & 1 & 1 & 1 & 1 & 0 & 1 \\ 0 & 0 & 0 & 0 & 0 & 0 & 0 & 0 & 0 & 1 & 0 & 0 & 1 & 1 & 1 & 1 & 0 & 1 & 1 & 0 & 1 & 1 & 1 & 1 & 0 & 0 & 1 & 0 & 0 & 1 & 0 & 1 & 1 \\ 0 & 0 & 0 & 0 & 0 & 0 & 0 & 0 & 0 & 0 & 1 & 0 & 0 & 0 & 0 & 1 & 1 & 1 & 0 & 0 & 1 & 1 & 1 & 0 & 1 & 1 & 0 & 0 & 1 & 1 & 0 & 0 \\ 0 & 0 & 0 & 0 & 0 & 0 & 0 & 0 & 0 & 0 & 0 & 1 & 1 & 1 & 1 & 1 & 0 & 1 & 1 & 0 & 0 & 1 & 0 & 0 & 1 & 1 & 0 & 1 & 1 & 0 & 1 & 1 & 1 \end{bmatrix} \quad (21)$$

$$SG_{(32,12,9)} = \begin{bmatrix} 0 & 1 & 1 & 1 & 0 & 1 & 0 & 0 & 1 & 1 & 1 & 0 & 1 & 1 & 1 & 0 & 0 & 1 & 0 & 1 & 1 & 1 & 1 & 0 & 0 & 0 & 0 & 0 & 0 & 1 & 1 & 1 \\ 0 & 0 & 1 & 1 & 1 & 0 & 1 & 0 & 0 & 1 & 1 & 1 & 0 & 0 & 0 & 1 & 1 & 0 & 0 & 1 & 1 & 0 & 1 & 0 & 0 & 0 & 1 & 1 & 0 & 1 & 0 & 1 \\ 1 & 0 & 0 & 1 & 1 & 1 & 0 & 1 & 0 & 0 & 1 & 1 & 1 & 1 & 0 & 0 & 1 & 0 & 0 & 1 & 1 & 1 & 0 & 1 & 0 & 0 & 0 & 0 & 1 & 0 & 1 & 1 \\ 1 & 1 & 0 & 0 & 1 & 1 & 1 & 0 & 1 & 0 & 0 & 1 & 0 & 0 & 1 & 1 & 1 & 0 & 1 & 1 & 1 & 1 & 0 & 0 & 1 & 0 & 0 & 0 & 1 & 0 & 0 & 0 \\ 1 & 1 & 1 & 0 & 0 & 1 & 1 & 1 & 0 & 1 & 0 & 0 & 0 & 0 & 0 & 0 & 1 & 1 & 0 & 0 & 1 & 1 & 0 & 1 & 0 & 0 & 1 & 0 & 0 & 0 & 1 & 0 \\ 0 & 1 & 1 & 1 & 0 & 0 & 1 & 1 & 1 & 0 & 1 & 0 & 1 & 1 & 0 & 0 & 0 & 0 & 1 & 1 & 1 & 1 & 0 & 0 & 0 & 1 & 1 & 1 & 1 & 0 & 0 & 1 \\ 0 & 0 & 1 & 1 & 1 & 0 & 0 & 1 & 1 & 1 & 0 & 1 & 1 & 1 & 0 & 0 & 0 & 0 & 0 & 1 & 1 & 0 & 1 & 0 & 1 & 0 & 1 & 1 & 1 & 1 & 0 & 0 \\ 1 & 0 & 0 & 1 & 1 & 1 & 0 & 0 & 1 & 1 & 1 & 0 & 0 & 0 & 0 & 0 & 1 & 1 & 0 & 1 & 1 & 0 & 0 & 0 & 1 & 0 & 0 & 1 & 1 & 1 & 1 & 0 \\ 0 & 1 & 0 & 0 & 1 & 1 & 1 & 0 & 0 & 1 & 1 & 1 & 1 & 1 & 1 & 1 & 1 & 0 & 1 & 0 & 1 & 0 & 1 & 1 & 1 & 1 & 0 & 0 & 1 & 0 & 0 & 0 \\ 1 & 0 & 1 & 0 & 0 & 1 & 1 & 1 & 0 & 0 & 1 & 1 & 1 & 1 & 0 & 0 & 1 & 1 & 0 & 1 & 1 & 1 & 1 & 0 & 0 & 0 & 0 & 0 & 1 & 1 & 1 & 0 \\ 1 & 1 & 0 & 1 & 0 & 0 & 1 & 1 & 1 & 0 & 0 & 1 & 1 & 1 & 0 & 0 & 0 & 1 & 0 & 1 & 1 & 1 & 1 & 0 & 0 & 1 & 0 & 0 & 0 & 0 & 1 & 0 \\ 1 & 1 & 1 & 0 & 1 & 0 & 0 & 1 & 1 & 1 & 0 & 0 & 1 & 1 & 0 & 0 & 0 & 0 & 0 & 1 & 0 & 1 & 0 & 1 & 0 & 1 & 1 & 1 & 0 & 1 & 1 \end{bmatrix} \quad (24)$$

It may be seen that, for example, the first row of this matrix is the modulo 2 sum of rows 1, 2, 3, 5, 8, 9 and 10 of matrix (21) in accordance with the non-singular matrix (22).

The final step in producing the public key generator matrix for the codewords from the message vectors is to permute the columns of the matrix above. Any permutation may be randomly chosen. For example we may use the following permutation $$\begin{array}{l} 27\ 15\ 4\ 2\ 19\ 21\ 17\ 14\ 7\ 16\ 20\ 1\ 29\ 8\ 11\ 12\ 25\ 5\ 30\ 24 \\ 6\ 18\ 13\ 3\ 0\ 26\ 23\ 28\ 22\ 31\ 9\ 10\ 0\ 1\ 2\ 3\ 4\ 5\ 6\ 7\ 8 \\ 9\ 10\ 11\ 12\ 13\ 14\ 15\ 16\ 17\ 18\ 19\ 20\ 21\ 22\ 23\ 24 \\ 25\ 26\ 27\ 28\ 29\ 30\ 31 \end{array} \quad (25)$$

so that for example column 0 of matrix (24) becomes column 24 of the permuted generator matrix and column 31 of matrix (24) becomes column 29 of the permuted generator matrix. The resulting, permuted generator matrix is given below.

$$PSG_{(32,12,9)} = \begin{bmatrix} 0 & 0 & 0 & 1 & 1 & 1 & 1 & 0 & 0 & 1 & 1 & 1 & 1 & 0 & 1 & 0 & 1 & 1 & 0 & 0 & 0 & 1 & 1 & 0 & 0 & 0 & 0 & 1 & 1 & 1 & 1 \\ 1 & 1 & 1 & 1 & 1 & 0 & 0 & 0 & 0 & 1 & 1 & 0 & 1 & 0 & 1 & 0 & 0 & 0 & 0 & 0 & 1 & 0 & 0 & 1 & 0 & 1 & 0 & 0 & 1 & 1 & 1 & 1 \\ 0 & 0 & 1 & 0 & 1 & 1 & 0 & 0 & 1 & 1 & 1 & 0 & 0 & 0 & 1 & 1 & 0 & 1 & 1 & 0 & 0 & 0 & 1 & 1 & 1 & 0 & 1 & 1 & 0 & 1 & 0 & 1 \\ 0 & 1 & 1 & 0 & 1 & 1 & 0 & 1 & 0 & 1 & 1 & 1 & 1 & 1 & 1 & 0 & 1 & 1 & 0 & 0 & 1 & 1 & 0 & 0 & 1 & 0 & 0 & 0 & 1 & 0 & 0 & 0 \\ 1 & 0 & 0 & 1 & 0 & 1 & 1 & 0 & 1 & 0 & 0 & 1 & 0 & 0 & 0 & 0 & 0 & 1 & 1 & 1 & 1 & 1 & 0 & 0 & 1 & 0 & 0 & 0 & 1 & 0 & 1 & 0 \\ 1 & 0 & 0 & 1 & 1 & 1 & 0 & 0 & 1 & 0 & 1 & 1 & 1 & 1 & 0 & 1 & 0 & 0 & 0 & 0 & 1 & 1 & 1 & 1 & 0 & 1 & 0 & 1 & 1 & 1 & 0 & 1 \\ 1 & 0 & 1 & 1 & 0 & 1 & 0 & 0 & 1 & 0 & 1 & 0 & 1 & 1 & 1 & 1 & 0 & 0 & 0 & 0 & 0 & 1 & 1 & 0 & 0 & 1 & 1 & 0 & 0 & 1 & 0 \\ 0 & 0 & 1 & 0 & 0 & 1 & 1 & 0 & 0 & 0 & 1 & 0 & 1 & 1 & 0 & 0 & 1 & 1 & 1 & 0 & 0 & 1 & 0 & 1 & 1 & 0 & 0 & 1 & 0 & 0 & 1 & 1 \\ 0 & 1 & 1 & 0 & 0 & 0 & 0 & 1 & 0 & 1 & 1 & 1 & 0 & 0 & 1 & 1 & 1 & 1 & 0 & 1 & 1 & 1 & 1 & 0 & 0 & 0 & 1 & 1 & 1 & 0 & 1 & 1 \\ 0 & 0 & 0 & 1 & 1 & 1 & 1 & 0 & 1 & 1 & 1 & 0 & 1 & 0 & 1 & 1 & 0 & 1 & 1 & 0 & 1 & 0 & 1 & 0 & 1 & 0 & 0 & 1 & 1 & 0 & 0 & 1 \\ 0 & 0 & 0 & 0 & 1 & 1 & 1 & 0 & 1 & 0 & 1 & 1 & 0 & 1 & 1 & 1 & 1 & 0 & 1 & 0 & 1 & 0 & 1 & 1 & 1 & 0 & 0 & 0 & 1 & 0 & 0 & 0 \\ 1 & 0 & 1 & 1 & 0 & 0 & 0 & 0 & 1 & 0 & 1 & 1 & 0 & 1 & 0 & 1 & 0 & 0 & 1 & 1 & 0 & 0 & 1 & 0 & 1 & 1 & 0 & 1 & 1 & 1 & 1 & 0 \end{bmatrix} \quad (26)$$

With this particular example of the Goppa code the message needs to be split into message vectors of length 12 bits adding padding bits as necessary so that there is an integral number of message vectors. As a simple example of a message, consider that the message consists of a single message vector with the information bit pattern $\{0, 1, 0, 1, 1, 1, 0, 0, 0, 0, 0, 1\}$. Starting with an all 0's vector, where the information bit pattern is a 1, the corresponding row from the permuted, scrambled matrix, matrix (26) with the same position is added modulo 2 to the result so far to produce the codeword which will form the digital cryptogram plus added random errors. In this example, this codeword is generated from adding modulo 2, rows 2, 4, 5, 6, and 12 from the permuted, scrambled matrix, matrix (26) to produce:

$$\begin{array}{l}
0\ 0\ 0\ 1\ 1\ 1\ 1\ 1\ 0\ 0\ 1\ 1\ 1\ 1\ 0\ 1\ 0\ 1\ 1\ 0\ 0\ 0\ 1\ 1\ 0\ 0\ 0\ 0\ 1\ 1\ 1\ 1 \\
+\ +\ +\ +\ +\ +\ +\ +\ +\ +\ +\ +\ +\ +\ +\ +\ +\ +\ +\ +\ +\ +\ +\ +\ +\ +\ +\ +\ +\ +\ +\ + \\
0\ 0\ 1\ 0\ 1\ 1\ 0\ 0\ 1\ 1\ 1\ 0\ 0\ 0\ 1\ 1\ 0\ 1\ 1\ 0\ 0\ 0\ 1\ 1\ 1\ 0\ 1\ 1\ 0\ 1\ 0\ 1 \\
+\ +\ +\ +\ +\ +\ +\ +\ +\ +\ +\ +\ +\ +\ +\ +\ +\ +\ +\ +\ +\ +\ +\ +\ +\ +\ +\ +\ +\ +\ +\ + \\
0\ 1\ 1\ 0\ 1\ 1\ 0\ 1\ 0\ 1\ 1\ 1\ 1\ 1\ 1\ 0\ 1\ 1\ 0\ 0\ 1\ 1\ 0\ 0\ 1\ 0\ 0\ 0\ 1\ 0\ 0\ 0 \\
+\ +\ +\ +\ +\ +\ +\ +\ +\ +\ +\ +\ +\ +\ +\ +\ +\ +\ +\ +\ +\ +\ +\ +\ +\ +\ +\ +\ +\ +\ +\ + \\
1\ 0\ 0\ 1\ 0\ 1\ 1\ 0\ 1\ 0\ 0\ 1\ 0\ 0\ 0\ 0\ 0\ 1\ 1\ 1\ 1\ 1\ 0\ 0\ 1\ 0\ 0\ 0\ 1\ 0\ 1\ 0 \\
+\ +\ +\ +\ +\ +\ +\ +\ +\ +\ +\ +\ +\ +\ +\ +\ +\ +\ +\ +\ +\ +\ +\ +\ +\ +\ +\ +\ +\ +\ +\ + \\
1\ 0\ 1\ 1\ 0\ 0\ 0\ 0\ 1\ 0\ 1\ 1\ 0\ 1\ 0\ 1\ 0\ 0\ 1\ 1\ 0\ 0\ 1\ 0\ 1\ 1\ 0\ 1\ 1\ 1\ 1\ 0 \\
\shortparallel\ \shortparallel\ \shortparallel\ \shortparallel\ \shortparallel\ \shortparallel\ \shortparallel\ \shortparallel\ \shortparallel\ \shortparallel\ \shortparallel\ \shortparallel\ \shortparallel\ \shortparallel\ \shortparallel\ \shortparallel\ \shortparallel\ \shortparallel\ \shortparallel\ \shortparallel\ \shortparallel\ \shortparallel\ \shortparallel\ \shortparallel\ \shortparallel\ \shortparallel\ \shortparallel\ \shortparallel\ \shortparallel\ \shortparallel\ \shortparallel\ \shortparallel \\
0\ 1\ 1\ 1\ 1\ 0\ 0\ 0\ 1\ 0\ 0\ 0\ 0\ 1\ 0\ 1\ 1\ 0\ 0\ 0\ 0\ 0\ 1\ 0\ 0\ 1\ 1\ 0\ 0\ 1\ 1\ 0
\end{array} \qquad (27)$$

The resulting codeword is {0 1 1 1 1 0 0 0 1 0 0 0 0 1 0 1 1 0 0 0 0 0 1 0 0 1 1 0 0 1 1 0}. This Goppa code can correct up to 4 errors, (t=4), so a random number is chosen for the number of bits to be in errors (s) and 2(t−s) bits are deleted from the codeword in pre-determined positions. The pre-determined positions may be given by a secret key, a position vector, known only to the originator and intended recipient of the cryptogram, may be included as part of the public key, or may be contained in a previous cryptogram sent to the recipient. An example of a position vector, which defines the bit positions to be deleted is
{19, 3, 27, 17, 8, 30, 11, 15, 2, 5, 19, . . . , 25}.
The notation being, for example, that if there are 2 bits to be deleted, the bit positions to be deleted are the first 2 bit positions in the position vector, 19 and 3. As well as the secret key, the position vector, the recipient needs to know the number of bits deleted, preferably with the information provided in a secure way. One method is for the message vector to contain, as part of the message, a number indicating the number of errors to be deleted in the next codeword, the following codeword (not the current codeword); the first codeword having a known, fixed number of deleted bits.

The number of bit errors and the bit error positions are randomly chosen to be in error. A truly random source such as a thermal noise source as described above produces the most secure results, but a pseudo random generator can be used instead, particularly if seeded from the time of day with fine time resolution such as 1 mS. If the number of random errors chosen is too few, the security of the digital cryptogram will be compromised. Correspondingly the minimum number of errors chosen is a design parameter depending upon the length of the Goppa code and t, the number of correctible errors. A suitable choice for the minimum number of errors chosen in practice lies between t/2 and 3t/4.

For the example above, consider that the number of bit errors is 2 and these are randomly chosen to be in positions 7 and 23 (starting the position index from 0). The bits in these positions in the codeword are inverted to produce the result {0 1 1 1 1 0 0 1 1 0 0 0 0 1 0 1 1 0 0 0 0 0 1 1 0 1 1 0 0 1 1 0}.

As there are 2 bits in error 4 bits (2(t−s)=2(4−2)) may be deleted. Using the position vector example above the deleted bits are in positions {19, 3, 27 and 17} resulting in 28 bits, {0 1 1 1 0 0 1 1 0 0 0 0 1 0 1 1 0 0 0 1 1 0 1 1 0 1 1 0}. This result forms the digital cryptogram which is transmitted or stored depending upon the application.

Figure 4:
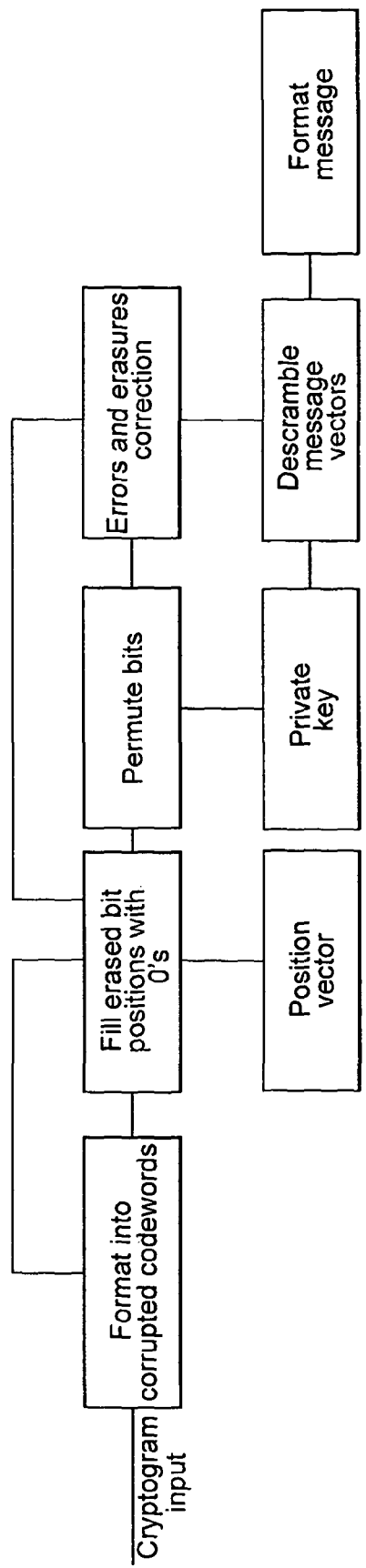
FIG. 4 is a block diagram which shows the structure of a Private Key decryption system with s random bit errors and 2(t−s) bit deletions according to an embodiment of the invention for use in decrypting messages produced by the encryption apparatus of FIG. 1.

The intended recipient of this cryptogram retrieves the message in a series of steps. FIG. 4 shows the system used for decryption. The retrieved cryptogram is formatted into corrupted codewords by format into corrupted codewords shown in FIG. 4. In the formatting process the number of deleted bits in each codeword is determined from the retrieved length of each codeword. The next step is to insert 0's in the deleted bit positions so that each corrupted codeword is of the correct length. This is carried out by fill erased positions with 0's using as input the position vector stored in a buffer memory as position vector in FIG. 4 plus the number of deleted (erased) bits from format into corrupted codewords. For the example above, the recipient first receives or otherwise retrieves the cryptogram {0 1 1 1 0 0 1 1 0 0 0 0 1 0 1 1 0 0 0 1 1 0 1 1 0 1 1 0}. The number of deleted bits and their positions and so inserts 0's in positions {19, 3, 27 and 17} to produce {0 1 1 0 1 0 0 1 1 0 0 0 0 1 0 1 1 0 0 0 0 0 1 1 0 1 1 0 0 1 1 0}.

The private key contains the information of which Goppa code was used, the inverse of the non-singular matrix used to scramble the data and the permutation applied to codeword symbols in constructing the public key generator matrix. This information is stored in private key in FIG. 4.

For the example, the private key is used to undo the permutation applied to codeword symbols by applying the following permutation:

$$\begin{array}{l}
0\ 1\ 2\ 3\ 4\ 5\ 6\ 7\ 8\ 9\ 10\ 11\ 12\ 13\ 14\ 15\ 16\ 17\ 18\ 19\ 20 \\
21\ 22\ 23\ 24\ 25\ 26\ 27\ 28\ 29\ 30\ 31\ 27\ 15\ 4\ 2\ 19 \\
21\ 17\ 14\ 7\ 16\ 20\ 1\ 29\ 8\ 11\ 12\ 25\ 5\ 30\ 24\ 6\ 18\ 13 \\
3\ 0\ 26\ 23\ 28\ 22\ 31\ 9\ 10
\end{array} \qquad (28)$$

so that for example bit 24 becomes bit 0 after permutation and bit 27 becomes bit 31 after permutation. The resulting, corrupted codeword is
{0 0 0 1 1 0 0 1 1 1 0 0 1 1 1 1 0 0 0 1 0 0 0 1 0 1 1 0 0 0 0 1}

The permutation is carried out by permute bits shown in FIG. 4. The next step is to treat the bits in the corrupted codeword as $GT(2^5)$ symbols and use the parity check matrix, matrix 19, from the private key to calculate the syndrome value for each row of the parity check matrix to produce $\alpha^{28}$, $\alpha^7$, $\alpha^{13}$, and $\alpha^{19}$. This is carried out by an errors and erasures decoder as a first step in correcting the errors and erasures. The errors and erasures are corrected by errors and erasures correction, which knows the positions of the erased bits from fill erased positions with 0's shown in FIG. 4.

In the example the errors and erasures are corrected using the syndrome values to produce the uncorrupted codeword. There are several published algorithms for errors and erasures decoding [6, 7, 8]. Using, for example the method described by Sugiyama [6], the uncorrupted codeword is obtained:
{1 0 0 0 1 0 0 1 1 1 0 0 0 0 1 0 0 1 1 1 0 1 1 0 0 1 1 0 0 1 0 1}

The scrambled information data is the first 12 bits of the codeword {1 0 0 0 1 0 0 1 1 1 0 0}.

The last step is to unscramble the scrambled data using matrix 23 to produce the original message after formatting the unscrambled data {0, 1, 0, 1, 1, 1, 0, 0, 0, 0, 0, 1}. In FIG. 4 descramble message vectors takes as input the matrix which is the inverse of the non-singular matrix stored in private key and outputs the descramble message vectors to format message.

In practice using the invention much longer codes of length n would be used than described above. Typically n is set equal to 1024, 2048, 4096 bits or longer. Longer codes are more secure but the public key is larger and encryption and decryption takes longer Consider a practical example with n=1024, correcting t=60 bit errors with a randomly chosen irreducible Goppa polynomial of degree 60, say, $g(z)=1+z+z^2+z^{23}+z^{60}$ Setting the number of inserted bit errors s as a randomly chosen number from 40 to 60, the number of deleted bits correspondingly, is 2(t−s), ranging from 40 to 0 and the average codeword length is 994 bits. There are $9.12\times10^{96}$ different bit error combinations providing security equivalent to a random key of length 325 bits. The message vector length is 424 bits per codeword of which 6 bits may be assigned to indicate the number of deleted bits in the following codeword.

As another example with n=2048 and correcting t=80 bit errors with a randomly chosen irreducible Goppa polynomial of degree 80, an example being $g(z)=1+z+z^3+z^{17}+z^{80}$ Setting the number of inserted bit errors s as a randomly chosen number from 40 to 80, the number of deleted bits correspondingly, is 2(t−s), ranging from 80 to 0 and the average codeword length is 2008 bits. There are $2.45\times10^{144}$ different bit error combinations providing security equivalent to a random key of length 482 bits. The message vector length is 1168 bits per codeword of which 7 bits may be assigned to indicate the number of deleted bits in the following codeword.

In a further embodiment of the invention to enhance the security, additional bits in error may be deliberately added to the cryptogram using the secret key, the position vector to determine the positions of the additional error bits. The number of additional bits in error is randomly chosen between 0 and n−1. The recipient needs to know the number of additional bits in error (as well as the position vector), preferably with this information provided in a secure way. One method is for the message vector to contain, as part of the message, the number of additional bits in error in the next codeword, the following codeword (not the current codeword); the first codeword having a known, fixed number of additional bits in error.

As each corrupted codeword contains more than t bits in error, it is theoretically impossible, even with the knowledge of the private key to recover the original codewords free from errors and to determine the unknown bits in the deleted bit positions. The system is depicted in FIG. 5.

Figure 5:
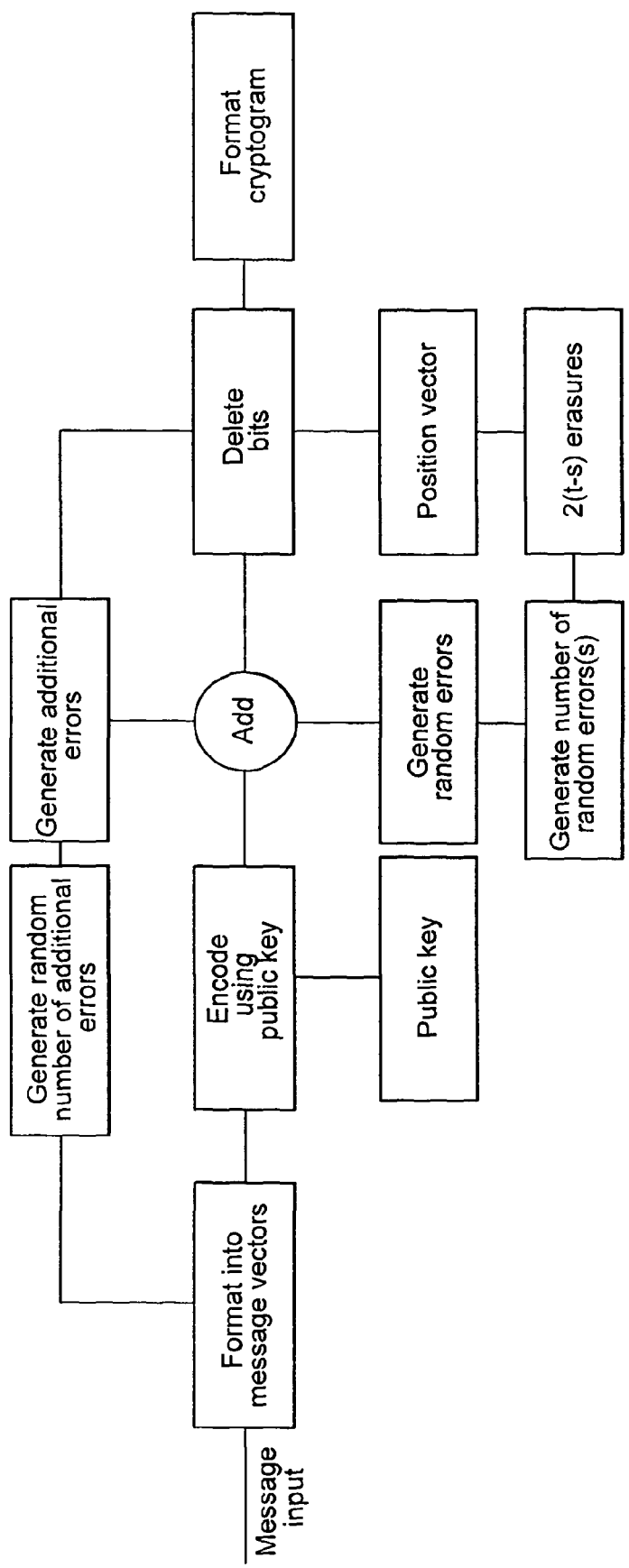
FIG. 5 is a block diagram which shows the structure of a Public Key encryption system according to a second embodiment of the invention with s random bit errors, 2(t−s) bit deletions and a random number of additional errors.

The encryption arrangement is as shown in FIG. 1 except that the system accommodates additional errors added by generate additional errors shown in FIG. 5 using a random integer generator between 0 and n−1 generated by generate random number of additional errors. Any suitable random integer generator may be used. For example, the random integer generator design shown in FIG. 2 may be used with the number of shift register stages p now set equal to m where $n=2^m$. Additional errors may be added in the same positions as random errors, as this provides for a simpler implementation or may take account of the positions of the random errors. However, there is no point in adding additional bit errors to bits which will subsequently deleted.

As shown in FIG. 5 the number of additional errors is communicated to the recipient as part of the message vector in the preceding codeword with the information included with the message. This is carried out by format into message vectors shown in FIG. 5. In this case usually 1 or 2 more message vectors in total will be required to convey the information regarding numbers of additional errors and the position vector (if this has not been already communicated to the recipient). Clearly there are alternative arrangements to communicate the numbers of additional errors to the recipient such as using a previously agreed sequence of numbers or substituting a pseudo random number generator for the truly random number generator (generate random number of additional errors shown in FIG. 5) with a known seed.

From the example above with the previous position vector {19, 3, 27, 17, 8, 30, 11, 15, 2, 5, 19, . . . , 25}.

In the example above, the errored bits are in positions 7 and 23 (starting the position index from 0) and the deleted bits are in positions {19, 3, 27 and 17}. The encoded codeword prior to corruption is:
{0 1 1 1 1 0 0 0 1 0 0 0 0 1 0 1 1 0 0 0 0 0 1 0 0 1 1 0 0 1 1 0}.

The number of additional bits in error is randomly chosen to be 5, say. As the first 4 positions (index 0 to 3) in the position vector are to be deleted bits, starting from index 4, the bits in codeword positions {8, 30, 11, 15, and 2} are inverted in addition to the errored bits in positions 7 and 23. The 32 bit corrupted codeword is produced:
{0 1 0 1 1 0 0 1 0 0 0 1 0 1 0 0 1 0 0 0 0 0 1 1 0 1 1 0 0 1 0 0}.

The bits in positions {19, 3, 27 and 17} are deleted to produce the 28 bit corrupted codeword: {0 1 0 1 0 0 1 0 0 0 1 0 1 0 0 1 0 0 0 1 1 0 1 1 0 1 0 0}.

Figure 6:
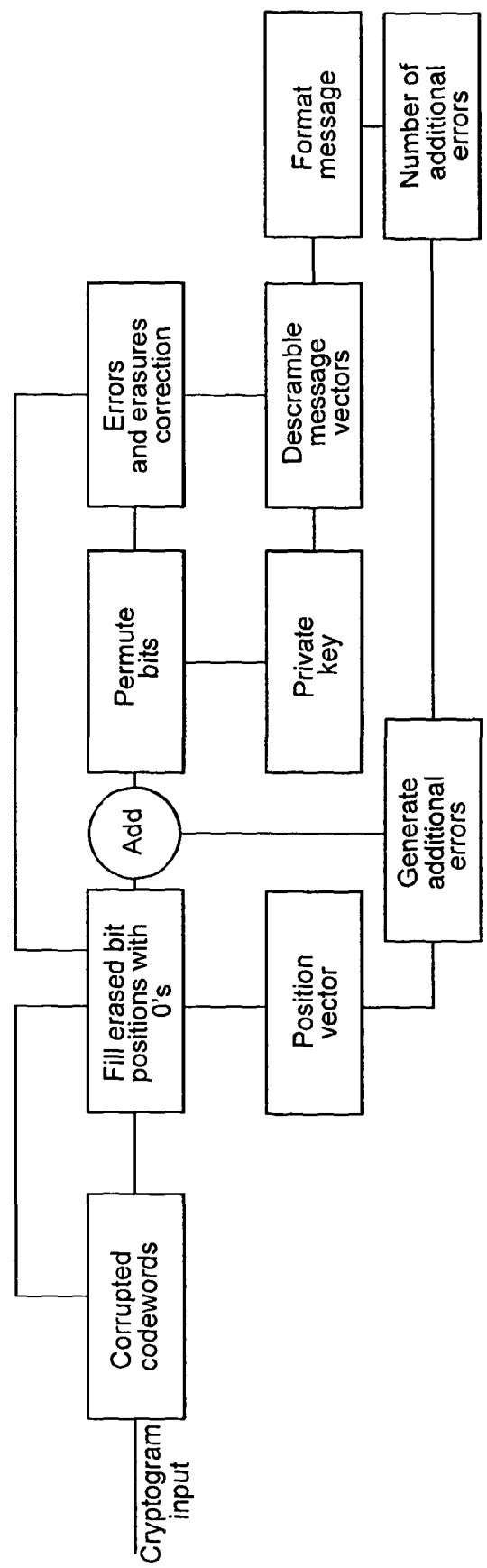
FIG. 6 is a block diagram which shows the structure of a Private Key decryption system with s random bit errors, 2(t−s) bit deletions and a random number of additional errors according to the second embodiment of the invention for use in decrypting messages produced by the encryption apparatus of FIG. 5.

In this embodiment of the invention, the additional bits in error are removed by the recipient of the cryptogram prior to errors and erasures correction as shown in FIG. 6. The number of additional bits in error in the following codewords are retrieved from the descrambled message vectors by format message shown in FIG. 6 and input to number of additional errors which outputs this number to generate additional errors which is the same as in FIG. 5. The position vector is stored in a buffer memory in position vector and outputs this to generate additional errors.

Each additional error is corrected by the adder add, shown in FIG. 6, which adds, modulo 2, a 1 which is output from generate additional errors in the same position of each additional error. Retrieval of the message from this point, follows correction of the errors and erasures, descrambling and formatting as described for FIG. 5. Following the example above, using the number of deleted bits and the position vector, 0's are inserted in the deleted bit positions to form the 32 bit corrupted codeword:
{0 1 0 0 1 0 0 1 0 0 0 1 0 1 0 0 1 0 0 0 0 0 1 1 0 1 1 0 0 1 0 0}.

Following the addition of the output from generate additional errors the bits in positions
{8, 30, 11, 15, and 2} are inverted, thereby correcting the 5 additional errors to form the corrupted codeword:
{0 1 1 0 1 0 0 1 1 0 0 0 0 1 0 1 1 0 0 0 0 0 1 1 0 1 1 0 0 1 1 0}.

As in the first embodiment of the invention, this corrupted codeword is permuted, the syndromes calculated and the errors plus erasures corrected to retrieve the original message.
{0, 1, 0, 1, 1, 1, 0, 0, 0, 0, 0, 1}

Figure 7:
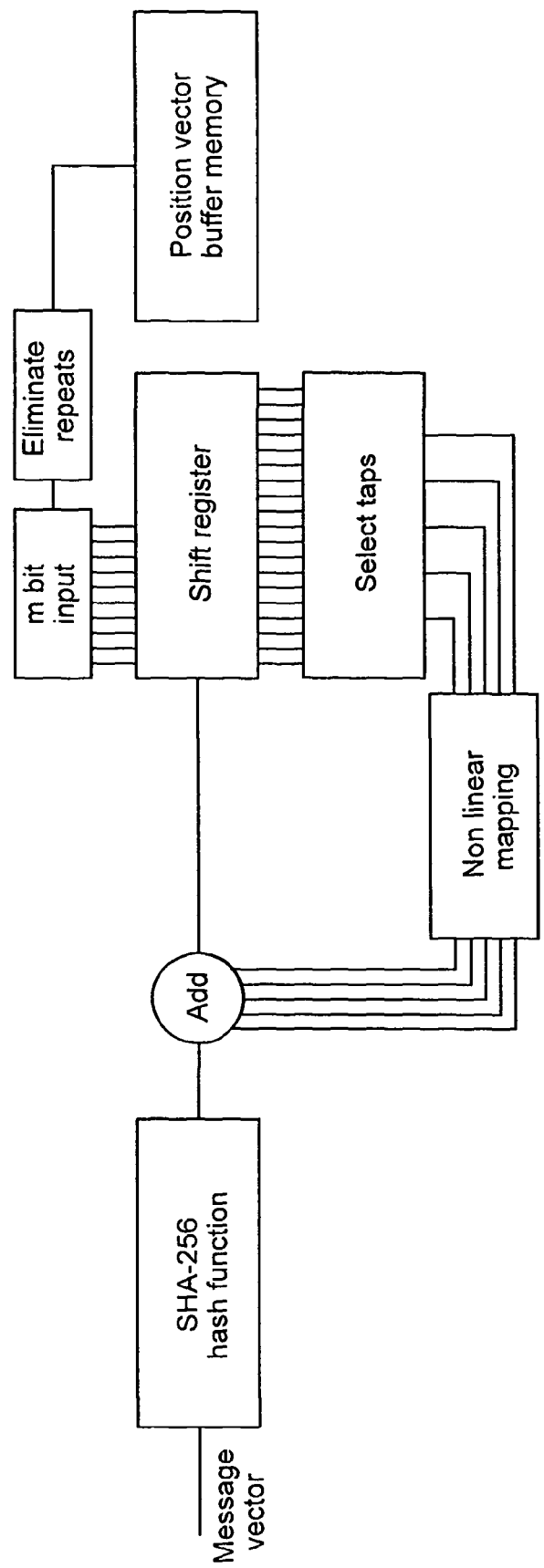
FIG. 7 is a block diagram which shows the structure of a position vector generator for generating error positions according to a further embodiment of the invention using a hash of message vector and non-linear feedback shift register.

In a further embodiment of the invention the position vector, instead of being a static vector, is derived from a cryptographic hash of a previous message vector. Any standard cryptographic hash function may be used such as MD5 [10] or SHA 2 [9]. Considering, for example use of the SHA-256 (a variant of SHA-2) as shown in FIG. 7. The message vector of length k bits is hashed using SHA-256 to produce a binary hash vector of length 256 bits.

By way of example, the binary hash vector is input to a non-linear feedback shift register consisting of shift register having p stages, typically 64 stages with outputs determined by select taps enabling different scrambling keys to be used by selecting different outputs the non-linear feedback shift register arrangement to produce a position vector in error positions buffer memory is the same as that of FIG. 3 whose operation is described above.

As the hash vector is clocked in to the non-linear feedback shift register of FIG. 7, a derived position vector is stored in error positions buffer memory, and used for encrypting the message vector as described above. The current message vector is encrypted using a position vector derived from the hash of the previous message vector. As the recipient of the cryptogram has decrypted the previous message vector, the recipient of the cryptogram can use the same hash function and non-linear feedback shift register to derive the position vector in order to decrypt the current corrupted codeword. There are a number of arrangements that may be used for the first codeword. For example a static position vector, known only to the sender and recipient of the cryptogram could be used or alternatively a position vector derived from a fixed hash vector known only to the sender and recipient of the cryptogram or the hash of a fixed message known only to the sender and recipient of the cryptogram. A simpler arrangement may be used where the shift register has no feedback so that the position vector is derived directly from the hash vector. In this case a hash has to be used in which the length of the hash vector exceeds n, the length of the codeword.

In a further embodiment of the invention, to enhance the security of the system, in addition to scrambling using the non-singular matrix implicitly contained in the Public Key, each message vector is independently scrambled using a scrambler which is derived from the random error vector which will be added to the codeword resulting from encoding with the scrambled generator matrix. In this embodiment of the invention the random error vector is generated first before the codeword is constructed by encoding with the scrambled generator matrix.

This scrambler which is derived from the error vector, for each message vector, may be implemented in a number of ways. The message vector may be scrambled by multiplying by a k×k non-singular matrix derived from the error vector.

Alternatively, the message vector may be scrambled by treating the message vector as a polynomial $m_1(x)$ of degree $k-1$ and multiplying it by a circulant polynomial $p_1(x)$ modulo $1+x^k$ which has an inverse [4]. The circulant polynomial $p_1(x)$ is derived from the error vector. Denoting the inverse of the circulant polynomial $p_1(x)$ as $q_1(x)$ then $$p_1(x)q_1(x)=1 \bmod 1+x^k \qquad (29)$$

Accordingly the scrambled message vector is $m_1(x)p_1(x)$ which is encoded into a codeword using the scrambled generator matrix. Each message vector is scrambled a different way as the error patterns are random and different from corrupted codeword to corrupted codeword. The corrupted codewords form the cryptogram as in the other embodiments of the invention.

On decoding of each codeword, the corresponding error vector is obtained with retrieval of the scrambled message vector. Considering the above example, the circulant polynomial $p_1(x)$ is derived from the error vector and the inverse $q_1(x)$ is calculated using Euclid's method [4] from $p_1(x)$. The original message vector is obtained by multiplying the retrieved scrambled message vector $m_1(x)p_1(x)$ by $p_1(x)$ because $$m_1(x)p_1(x)q_1(x)=m_1(x) \bmod 1+x^k \qquad (30)$$

Figure 8:
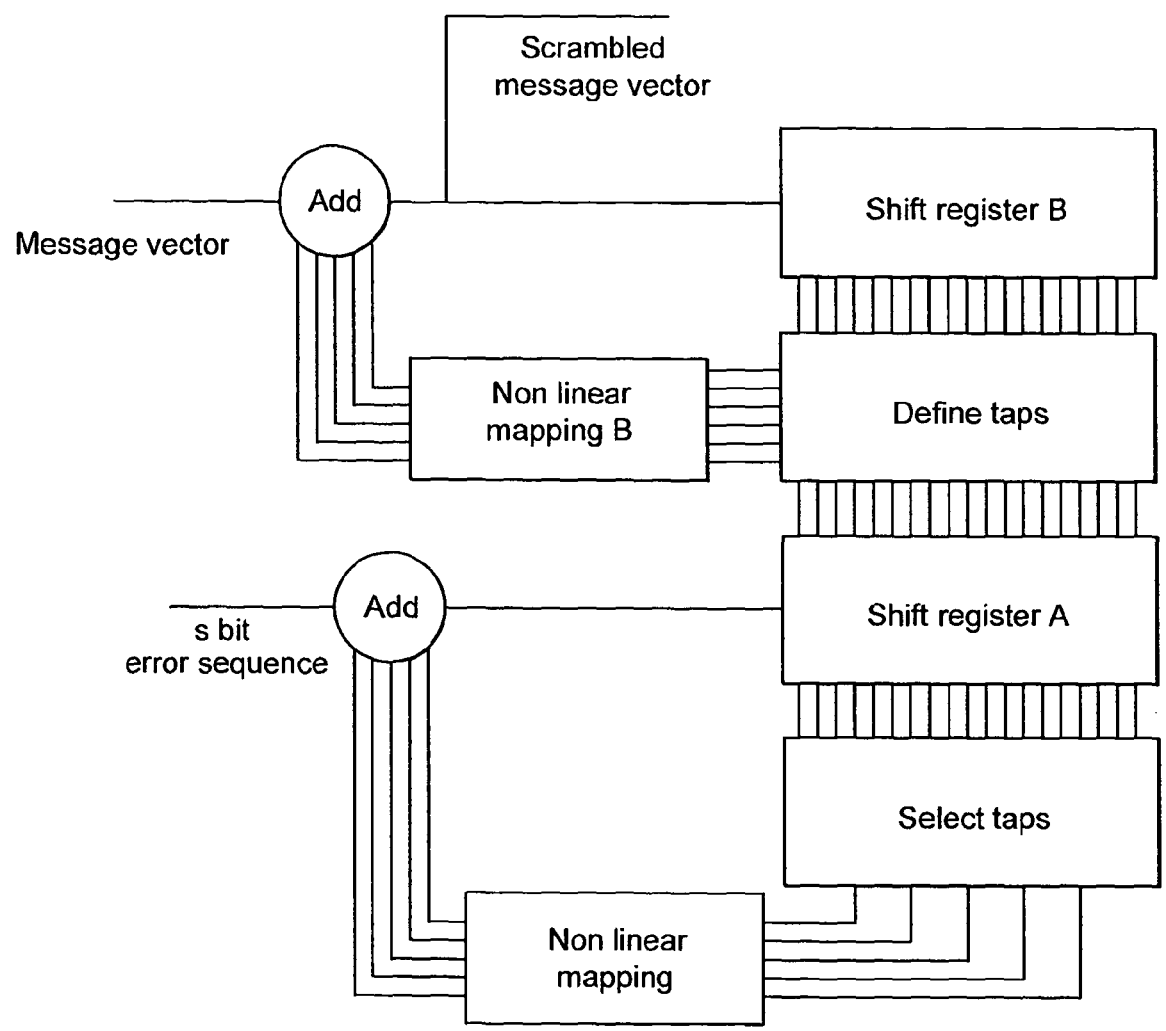
FIG. 8 is a block diagram which shows the structure of a message vector scrambler according to a further embodiment of the invention using non-linear feedback shift register with taps defined by s bit error pattern.

Another example of scrambling each message vector using a scrambler derived from the error vector is to use two non-linear feedback shift registers as shown in FIG. 8. The first operation is for the error vector, which is represented as a s bit sequence is input to a modulo 2 adder add whose output is input to shift register A as shown in FIG. 8. The non-linear feedback shift registers are the same as in FIG. 3 with operation as described above but select taps will usually have a different setting and non linear mapping also will usually have a different mapping, but this is not essential. After clocking the s bit error sequence into the non-linear feedback shift register, shift register A shown in FIG. 8 will essentially contain a random binary vector. This vector is used by define taps to define which outputs of shift register B are to be input to non linear mapping B whose outputs are added modulo 2 to the message vector input to form the input to shift register B shown in FIG. 8. The scrambling of the message vector is carried out by a non-linear feedback shift register whose feedback connections are determined by a random binary vector derived from the error vector, the s bit error sequence.

Figure 9:
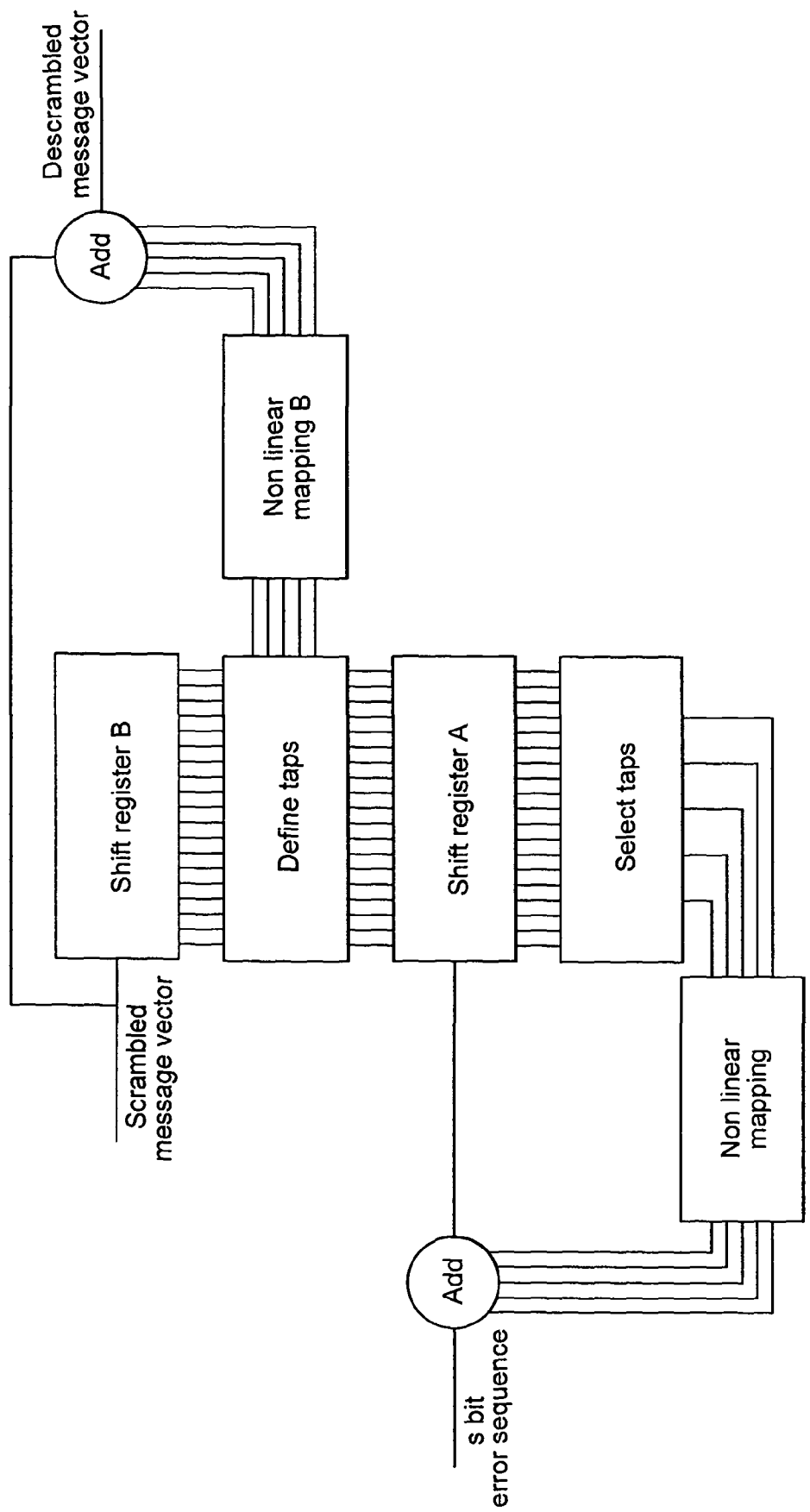
FIG. 9 is a block diagram which shows the structure of a corresponding descrambler.

The corresponding descrambler is shown in FIG. 9. Following decoding of each corrupted codeword, having correcting the random errors and bit erasures the scramble message vector is obtained and the error vector in the form of the s bit error sequence. As in the scrambler, the s bit error sequence is input to a modulo 2 adder add whose output is input to shift register A as shown in FIG. 9. After clocking the s bit error sequence into the non-linear feedback shift register, shift register A shown in FIG. 9 will contain exactly the same binary vector as shift register A of FIG. 8. Consequently exactly the same outputs of shift register B to be input to non linear mapping B will be defined by define taps. Moreover comparing the input of shift register B of the scrambler FIG. 8 to the input of shift register B of the descrambler FIG. 9 it will be seen that the contents are identical and equal to the scrambled message vector.

Consequently the same selected shift register outputs will be identical and with the same non-linear mapping non linear mapping B the outputs of non linear mapping B in FIG. 9 will be identical to those that were the outputs of non linear mapping B in FIG. 8. The result of the addition of these outputs modulo 2 with the scrambled message vector is to produce the original message vector at the output of add in FIG. 9.

This is carried out for each scrambled message vector and associated error vector to recover the original message.

In some applications a reduced size cryptogram is essential perhaps due to limited communications or storage capacity. For these applications a further embodiment of the invention may be used in which the cryptogram consists of only one corrupted codeword containing random errors, the first codeword. The following codewords are corrupted by only deleting bits. The number of deleted bits is 2t bits per codeword using a position vector as described above.

For example with n=1024, and the Goppa code correcting t=60 bit errors, there are 2t bits deleted per codeword so that apart from the first corrupted codeword, each corrupted codeword is only 904 bits long and conveys 624 message vector bits per corrupted codeword.

In another example with n=2048 and correcting t=80 bit errors apart from the first corrupted codeword, each corrupted codeword is only 1888 bits long and conveys 1168 message vector bits per corrupted codeword.

In a further embodiment of the invention with the aim of minimising the cryptogram size for a given message the cryptogram consists of only one corrupted codeword containing random errors, the first codeword. The error vector of the first codeword is used to derive a scrambler for the following message vector as described above. All of the message vectors following the first codeword are scrambled using this scrambler and the scrambled message vectors are appended to the first corrupted codeword to form the cryptogram. For example with n=2048 and a Goppa code correcting t=80 bit errors and 11 message vectors of length 1168 bits, assuming no deleted bits in the first codeword, the cryptogram is only 2048+10×1168=13728 bits long and conveys 12848 bits.

Decryption is carried out by using the private key to retrieve the first codeword and its associated error pattern, deriving the descrambler from the error pattern and descrambling the scrambled message vectors to retrieve the message.

The invention may be used in a wide number of different applications such as active and passive RFID, secure barcodes, secure ticketing, magnetic cards, message services, e-mail applications, digital broadcasting, digital communications, wireless communications, video communications and digital storage. As an example, considering bar-codes and passive RFID as these have fixed codes and use short sequences that are easy to read by anybody with suitable equipment. The invention may be used to encrypt the information using a public key to form a cryptogram that can only be decrypted with the private key. As the encryption key is public there is no need for highly secure key management at the point where the bar-codes and RFID tags are manufactured. A relatively short Goppa code may be used to construct the public key, for example n=128 bits. With t=15, and s ranging from 7 to 15, the number of error combinations is $1.8 \times 10^{19}$ equivalent to a secure key of length 64 bits. A message of length 23 bits can be encrypted and securely contained in the bar-code or passive RFID tag. With bit deletions the cryptogram is reduced in length from 128 bits to an average of 113 bits.

Figure 10:
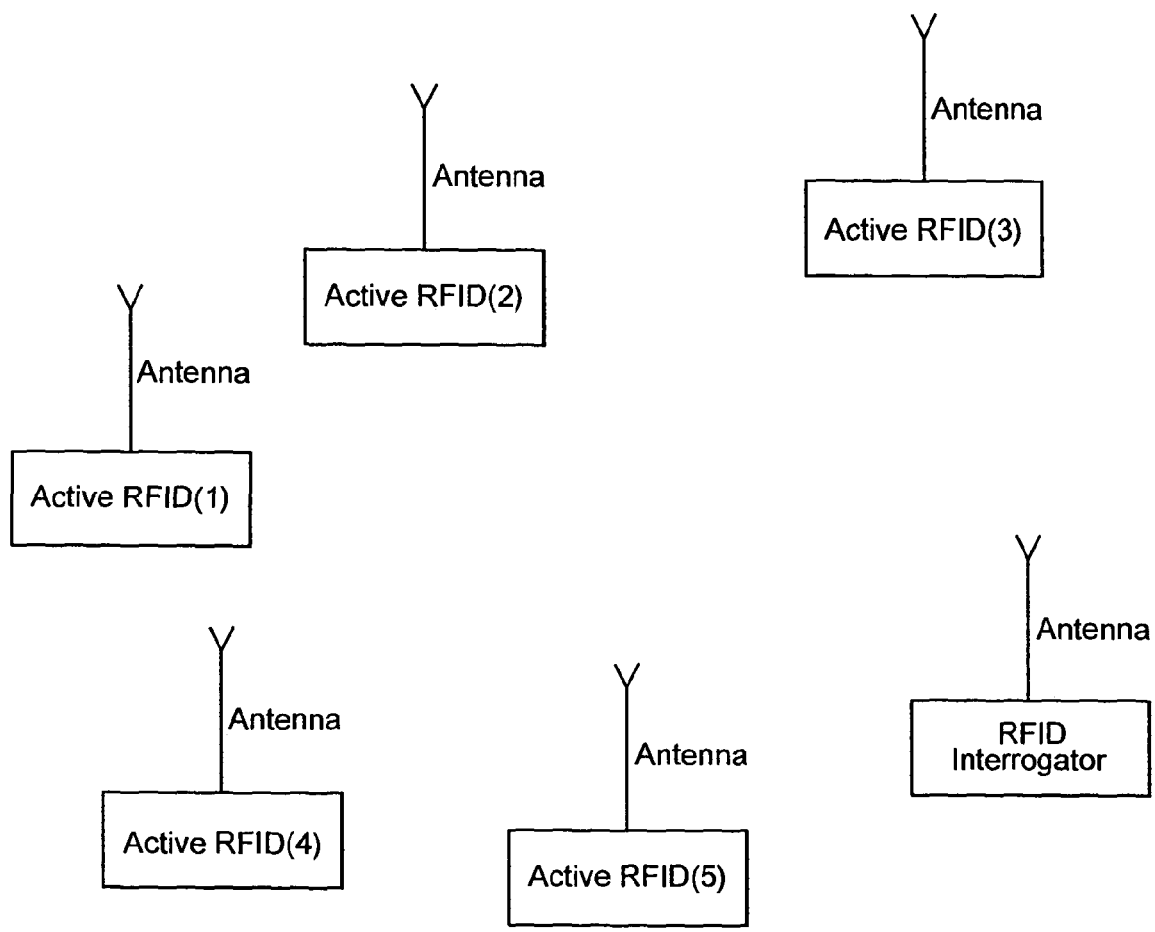
FIG. 10 is a block diagram which shows schematically a system of Active RFID devices utilising embodiments of the present invention.

An application using wireless, for example with active RFID is shown in FIG. 10 depicting 5 containers Active RFID(1) through to Active RFID(5) equipped with active RFID transponders. The containers are periodically monitored by RFID Interrogator shown by FIG. 10 by RFID Interrogator which transmits using wireless transmission, a request for information to each of the containers in turn. Each container, Active RFID(1) through to Active RFID(5) responds with a wireless message. In order to keep the information transmitted by the containers' secure each encrypts their information using their own public key. The private keys are held by RFID Interrogator. Even if the wireless transmissions are intercepted the information cannot be retrieved without knowledge of the private key. As an example with n=256 bits, t=20 transmissions and with s ranging from 10 to 20, the number of error combinations is $3.1 \times 10^{29}$ equivalent to a secure key of length 98 bits. A message of length 96 bits can be encrypted with an average wireless transmission of 246 bits duration.

It is apparent that a similar system could be used for secure messaging such as e-mail or text messaging.

As encryption consists of the addition, modulo 2 of rows of the scrambled generator matrix according to the 1's in the message vector, encryption with hardware can be extremely fast which is useful for encryption in data storage or high speed data such as encoded video. Similarly as the slowest function involved in decryption is essentially the error and erasure correction of corrupted codewords, it is known from examples of implemented hardware of such decoders that this can also be carried out at speeds beyond 1 Gbit/sec.

OTHER ASPECTS AND EMBODIMENTS

Other applications will be evident to the skilled reader. The present invention is limited only by the scope of the appended claims and extends to all obvious variations, modifications and substitutions that would be apparent to the reader. Protection is hereby sought for any and all novel subject-matter and combinations thereof, whether or not the same are the subject of claims in the application as filed.

REFERENCES

[1] R. J. McEliece, *A Public-Key Cryptosystem based on Algebraic Coding Theory*, DSN Progress Report 42-44, 1978.
[2] V. D. Goppa, *A new class of linear error-correcting codes*, Probl. Inform. Transm, Vol 6, p.p. 24-30, 1970.
[3] J. Riek and G. McFarland, U.S. Pat. No. 5,054,066—Error correcting public key cryptographic method and program
[4] F. J. MacWilliams and N. J. A. Sloane, *The Theory of Error Correcting Codes*, North Holland, 1977
[5] S. Lin and D. J. Costello, Jr., *Error Control Coding*, $2^{nd}$ ed., Pearson Prentice Hall, 2004
[6] Y. Sugiyama, M. Kasahara, S. Hirasawa, and T. Namekawa, *An erasures-and-errors decoding algorithm for Goppa codes*, IEEE Trans. Inform. Theory, vol. IT-22, pp. 238-241, March 1976.
[7] C. T. Retter, *Decoding Goppa codes with a BCH decoder*, IEEE Trans. Inform. Theory, vol. IT-21, p. 112, January 1975.
[8] E. R. Berlekamp, *Algebraic Coding Theory*, McGraw-Hill, 1968.
[9] *Secure Hash Signature Standard (SHS)*, FIPS PUB 1802.
[10] R. Rivest RFC 1321, MIT Laboratory for Computer Science and RSA Data Security, April 1992

The invention claimed is:

1. A method using computer hardware to encrypt data by constructing a digital cryptogram using a public key algorithm, the method comprising:
   (a) converting a message to be sent into binary form and formatting it by appending dummy bits as necessary into an integral number r of binary message vectors of length k bits each;
   (b) for each binary message vector, randomly generating an associated error vector of length n bits, containing s bit errors;
   (c) generating an associated reversible mapping function for each binary message vector from the associated error vector, wherein the reversible mapping function uses a k bit to k bit scrambling function that is derived from the associated error vector;
   (d) mapping each binary message vector into a different mapped binary message vector using the associated reversible mapping function;
   (e) constructing a first generator matrix of a binary code with dimension k with a pre-selected Galois field whose base field is 2, and a Goppa polynomial whose degree is such that the corresponding binary code provides a t error correcting capability by utilizing n-k parity bits;
   (f) constructing a scrambled k×n generator matrix by matrix multiplication, said scrambled generator matrix being the product of a non-singular matrix, said first generator matrix and a permutation matrix;
   (g) encoding each mapped binary message vector by adding rows of said scrambled generator matrix according to the 1's in each mapped message vector to form r codeword vectors of length n bits;
   (h) adding the associated error vector to each codeword vector using modulo 2 arithmetic and deleting 2(t−s) bits from the codeword vector according to a pre-defined position vector, to form r corrupted codeword vectors; and
   (i) forming a cryptogram from the r said corrupted codeword vectors.

2. The method of claim 1, further comprising, for each codeword vector, using a random number generator to generate independently an integer u such that u<n−2(t−s), and wherein the randomly generated error vector for each binary message vector contain s bit errors in randomly generated bit positions plus u bit errors in pre-defined positions according to a position vector.

3. The method of claim 1, wherein the mapping is carried out by a non-linear feedback shift register featuring a nonlinear mapping of selected outputs of the shift register added, modulo 2, to the input.

4. The method of claim 2, wherein the random number generator includes amplified, thermal noise which is quantised as bits and input to a shift register which is output as a binary representation of the random number.

5. The method of claim 1, wherein the position vector is defined by a sequence of integers, such that there are no repeated integers having the same value, generated as outputs of a non-linear shift register featuring a non-linear mapping of selected outputs of the shift register added, modulo 2, to quantised amplified, thermal noise.

6. The method of claim 1, wherein some corrupted codewords only have bit deletions.

7. The method of claim 1, wherein the cryptogram contains some scrambled message vectors which are not encoded as codewords or corrupted with bit errors or bit deletions.

8. The method of claim 1, further comprising reconstructing a message from a digital cryptogram constructed according to claim 3, by:
   (a) retrieving said cryptogram from a communications channel or storage medium as r retrieved vectors, each of length n symbols by inserting a 0 for each pre-defined, deleted bit, marking the position as an erased symbol such that each retrieved vector does not contain more the s bit errors and 2(t−s) erasures;

(b) multiplying each retrieved vector by the inverse of the permutation matrix used in creating the public key scrambled generator matrix to obtain a codeword of a Goppa code corrupted with no more than s bit errors and 2(t−s) erasures;

(c) applying an erasure and error correcting decoding algorithm to each corrupted codeword to form r scrambled binary message vectors of length k bits each and r error vectors;

(d) for each error vector, deriving a scrambler whose key is derived from the said error vector and descrambling the corresponding scrambled k bit message vector into a k bit non-singular matrix scrambled message vector;

(e) multiplying each non-singular matrix scrambled binary message vector by the inverse of the non-singular matrix used in creating the public key scrambled generator matrix to derive r unscrambled binary message vectors; and (f) reformatting the r unscrambled binary message vectors removing appended dummy bits to form the original digital message.

9. A system comprising computer hardware configured to encrypt data by constructing a digital cryptogram using a public key algorithm, the computer hardware performing the steps of:

(a) converting a message to be sent into binary form and formatting it by appending dummy bits as necessary into an integral number r of binary message vectors of length k bits each;

(b) for each binary message vector, randomly generating an associated error vector of length n bits, containing s bit errors;

(c) generating an associated reversible mapping function for each binary message vector from the associated error vector, wherein the reversible mapping function uses a k bit to k bit scrambling function that is derived from the associated error vector;

(d) mapping each binary message vector into a different mapped binary message vector using the associated reversible mapping function;

(e) constructing a first generator matrix of a binary code with dimension k with a pre-selected Galois field whose base field is 2, and a Goppa polynomial whose degree is such that the corresponding binary code provides a t error correcting capability by utilizing n-k parity bits;

(f) constructing a scrambled k×n generator matrix by matrix multiplication, said scrambled generator matrix being the product of a non-singular matrix, said first generator matrix and a permutation matrix;

(g) encoding each mapped binary message vector by adding rows of said scrambled generator matrix according to the 1's in each mapped message vector to form r codeword vectors of length n bits;

(h) adding the associated error vector to each codeword vector using modulo 2 arithmetic and deleting 2(t−s) bits from the codeword vector according to a pre-defined position vector, to form r corrupted codeword vectors; and (i) forming a cryptogram from the r said corrupted codeword vectors.

10. The apparatus of claim 9, wherein a passive RFID or bar-code system encrypts information securely such that the information can only be retrieved using the private key.

11. The apparatus of claim 9, wherein an active RFID system encrypts information and transmits the cryptogram using wireless such that the information cannot be retrieved using a wireless receiver without knowledge of the private key.

12. The apparatus of claim 9, wherein an e-mail or text messaging service encrypts information using a public key and transmits the cryptogram such that the information cannot be retrieved by interception of the transmission without knowledge of the private key.

13. A non-transitory computer-readable storage medium storing computer-executable steps for carrying out a method of encrypting data by constructing a digital cryptogram using a public key algorithm, by:

(a) converting a message to be sent into binary form and formatting it by appending dummy bits as necessary into an integral number r of binary message vectors of length k bits each;

(b) for each binary message vector, randomly generating an associated error vector of length n bits, containing s bit errors;

(c) generating an associated reversible mapping function for each binary message vector from the associated error vector, wherein the reversible mapping function uses a k bit to k bit scrambling function that is derived from the associated error vector;

(d) mapping each binary message vector into a different mapped binary message vector using the associated reversible mapping function;

(e) constructing a first generator matrix of a binary code with dimension k with a pre-selected Galois field whose base field is 2, and a Goppa polynomial whose degree is such that the corresponding binary code provides a t error correcting capability by utilizing n-k parity bits; and (f) constructing a scrambled k×n generator matrix by matrix multiplication, said scrambled generator matrix being the product of a non-singular matrix, said first generator matrix and a permutation matrix;

(g) encoding each mapped binary message vector by adding rows of said scrambled generator matrix according to the 1's in each mapped message vector to form r codeword vectors of length n bits;

(h) adding the associated error vector to each codeword vector using modulo 2 arithmetic and deleting 2(t−s) bits from the codeword vector according to a pre-defined position vector, to form r corrupted codeword vectors; and (i) forming a cryptogram from the r said corrupted codeword vectors.

* * * * *